US006304857B1

(12) United States Patent
Heindel et al.

(10) Patent No.: US 6,304,857 B1
(45) **Date of Patent: *Oct. 16, 2001**

(54) DISTRIBUTED ELECTRONIC BILLING SYSTEM WITH GATEWAY INTERFACING BILLER AND SERVICE CENTER

(75) Inventors: David G. Heindel, Woodinville; Todd Alan Buiten, Kent; Bert Speelpenning; Bassam A. Saliba, both of Kirkland; Jeffrey L. Keith; Eric G. Jakstadt, both of Woodinville, all of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,959

(22) Filed: Jun. 8, 1998

(51) Int. Cl.[7] .......... G06F 17/00
(52) U.S. Cl. .......... 705/34
(58) Field of Search .......... 707/506; 705/34, 705/30, 40, 27; 713/153

(56) References Cited

U.S. PATENT DOCUMENTS

| | | | |
|---|---|---|---|
| 3,842,248 | 10/1974 | Yarnell et al. | 235/156 |
| 3,852,571 | 12/1974 | Hall et al. | 235/61.7 B |
| 4,485,300 | 11/1984 | Peirce | 235/380 |
| 4,701,601 | 10/1987 | Francini et al. | 235/449 |
| 4,734,564 | 3/1988 | Boston et al. | 235/380 |
| 4,799,156 | 1/1989 | Shavit et al. | 364/401 |
| 4,823,264 | 4/1989 | Deming | 364/408 |
| 4,839,504 | 6/1989 | Nakano | 235/379 |
| 4,893,248 | 1/1990 | Pitts et al. | 364/464.01 |

(List continued on next page.)

FOREIGN PATENT DOCUMENTS

| | | |
|---|---|---|
| 0 745 947 A2 | 5/1996 | (EP) . |
| 02000113089A * | 4/2000 | (JP) . |

(List continued on next page.)

OTHER PUBLICATIONS

PR Newswire, "Template Software Strengthens Core Product Family With Ease–of–Use and Functional Enhancements that Promote Unparalleled Software Reuse", Dialog File 621, Access No. 01544425, Jun. 1997.*

(List continued on next page.)

*Primary Examiner*—James P. Trammell
*Assistant Examiner*—Pierre E. Elisca
(74) *Attorney, Agent, or Firm*—Lee & Hayes, PLLC

(57) ABSTRACT

An electronic billing system provides a set of tools for a biller to create and design a customized billing statement. The system includes a statement designer that enables the biller to create a template for the billing statement. Once the statement is designed, the biller provides the statement format and billing data to a third party billing service center, which generates the electronic billing statements in the biller-designed format and electronically distributes the billing statements to consumers. To assist the biller in creating statement templates, the biller integration system maintains industry schema tables that are tailored to particular industries. The tables provide a default set of predefined billing categories for a given industry that the biller might wish to use in its template. The biller integration system and service center are each equipped with a gateway to facilitate the exchange of the statement template and billing data. Each gateway has a parcel manager to reliably transfer parcels and track the parcels as they go from computer to computer. Through this parcel handling and monitoring system, the biller integration system keeps the biller informed as to the location and status of the statement templates, the billing data, any forthcoming payments, and so forth.

27 Claims, 10 Drawing Sheets

U.S. PATENT DOCUMENTS

| | | | | |
|---|---|---|---|---|
| 4,905,826 | | 3/1990 | Martin | 206/286 |
| 4,949,272 | | 8/1990 | Vanourek et al. | 364/464.02 |
| 4,979,207 | | 12/1990 | Baum et al. | 379/112 |
| 4,992,940 | | 2/1991 | Dworkin | 364/401 |
| 5,027,388 | | 6/1991 | Bradshaw et al. | 379/112 |
| 5,091,868 | * | 2/1992 | Pickens et al. | 707/506 |
| 5,121,945 | | 6/1992 | Thomson et al. | 283/58 |
| 5,197,094 | | 3/1993 | Tillery et al. | 379/91 |
| 5,206,488 | | 4/1993 | Teicher | 235/380 |
| 5,220,501 | | 6/1993 | Lawlor et al. | 364/408 |
| 5,223,699 | | 6/1993 | Flynn et al. | 235/380 |
| 5,229,584 | | 7/1993 | Erickson | 235/375 |
| 5,265,033 | | 11/1993 | Vajk et al. | 364/514 |
| 5,283,829 | | 2/1994 | Anderson | 380/24 |
| 5,287,270 | | 2/1994 | Hardy et al. | 364/408 |
| 5,325,290 | | 6/1994 | Cauffman et al. | 364/401 |
| 5,326,959 | | 7/1994 | Perazza | 235/379 |
| 5,383,113 | | 1/1995 | Kight et al. | 364/401 |
| 5,402,336 | | 3/1995 | Spiegelhoff et al. | 364/401 |
| 5,420,405 | | 5/1995 | Chasek | 235/379 |
| 5,424,938 | | 6/1995 | Wagner et al. | 364/408 |
| 5,465,206 | | 11/1995 | Hilt et al. | 364/406 |
| 5,473,143 | | 12/1995 | Vak et al. | 235/380 |
| 5,477,038 | | 12/1995 | Levine et al. | 235/380 |
| 5,483,445 | | 1/1996 | Pickering | 364/406 |
| 5,508,817 | | 4/1996 | Kunigami | 358/402 |
| 5,532,920 | | 7/1996 | Hartrick et al. | 364/419.1 |
| 5,557,518 | | 9/1996 | Rosen | 364/408 |
| 5,570,465 | | 10/1996 | Tsakanikas | 395/114 |
| 5,590,197 | | 12/1996 | Chen et al. | 380/24 |
| 5,644,727 | | 7/1997 | Atkins | 395/240 |
| 5,649,117 | | 7/1997 | Landry | 395/240 |
| 5,652,786 | | 7/1997 | Rogers | 379/91.01 |
| 5,655,089 | | 8/1997 | Bucci | 395/240 |
| 5,684,965 | | 11/1997 | Pickering | 395/234 |
| 5,699,528 | | 12/1997 | Hogan | 395/240 |
| 5,761,650 | * | 6/1998 | Munsil et al. | 705/34 |
| 5,832,460 | * | 11/1998 | Bednar et al. | 705/27 |
| 5,848,400 | | 12/1998 | Chang | 705/35 |
| 5,884,284 | | 3/1999 | Peters et al. | 705/30 |
| 5,884,288 | | 3/1999 | Chang et al. | 705/40 |
| 5,903,881 | | 5/1999 | Schrader et al. | 705/42 |
| 5,963,925 | * | 10/1999 | Kolling et al. | 705/40 |
| 5,974,146 | | 10/1999 | Randle et al. | 380/24 |
| 5,978,577 | * | 11/1999 | Rierden et al. | 395/610 |
| 5,978,780 | | 11/1999 | Watson | 705/40 |
| 5,978,840 | * | 11/1999 | Nguyen et al. | 709/217 |
| 6,035,281 | * | 3/2000 | Crosskey et al. | 705/14 |

FOREIGN PATENT DOCUMENTS

| | | |
|---|---|---|
| WO 91/16691 | 4/1991 | (WO) . |
| WO 93/08545 | 10/1992 | (WO) . |
| WO 96/08783 | 9/1995 | (WO) . |
| WO 97/24680 | 7/1997 | (WO) . |

OTHER PUBLICATIONS

Richard K. Crone, "Who Does MSFDC Really Serve?", Dialog File 696, Access No. 00581887, Dec. 16, 1997.*

Business Wire, "Just In Time Solutions Introduces BillCast Family of Products for Open Internet Billing", May 1998.*

American Payment Systems; Electronic Funds & Data Corp., Faulker & Gray, Inc., 1997.*

Brown, Bob; "TI, SW Bell Unite in EDI Billing Trial," The American City, Aug. 1963.

Vandenengel, Gerry; "Cards on the Internet—Advertising on a $3 Bill," World Card Technology, Feb., 1995, pp. 46–48.

"A Different Drummer on the Data Highway," American Banker, May 12, 1995, 2 pages.

Meredith, Robin; "Internet Bank Moves Closer to Virtual Reality," USA Today, May 5, 1995.

Strassel, Kim A.; "Dutch Software Concern Experiments With Electronic 'Cash' in Cyberspace," The Wall Street Journal, Apr. 17, 1995.

Rosen, Nick; "Cash Just Isn't Flexible Enough," Daily Express, Feb. 10, 1995.

Piskora, Beth; "Debit Cards Seen Poised for New Markets," American Banker, Mar. 7, 1995.

Bank, David; "Cash, Check, Charge—What's Next?," Seattle Times, Mar. 6, 1995, 4 pages.

Cortese, Amy; "Cyberspace—Crafting software that will let you build a business out there," Business Week, Feb. 27, 1995, 7 pages.

Sirbu, Marvin and Tygar, J. D.; "NetBill; An Internet Commerce System Optimized for Network Delivered Services," Engineering and Public Policy Dept. and Computer Science Dept. Carnegie Mellon University, Pittsburg, Pennsylvania, Feb. 27, 1995, pp. 1–12.

Kutler, Jeffrey; "Cash Card Creator Looking Beyond Mondex," Feb. 9, 1995.

Post, David; "E–Cash: Can't Live With It, Can't Live Without It," The American Lawyer, Mar. 1995, pp. 116–117.

Gullo, Karen; "Electronic Bill Payment," American Banker, Jan. 27, 1992.

"Management Utility Billing," Jul./Aug. 1979, 5 pages.

Myers, Edith; "Banking on PCs," Datamation, 6 pages.

Gullo, Karen; "Citicorp Device is Called Pivotal for Home Banking," American Banker, Mar. 1, 1990.

"Newsnet Reference Guide 1994," Newsnet Inc., 945 Haverford Road, Bryn Mawr, PA 19010.

Palmer, James A. and Gaj, Steven J.; "Consolidated Third Party Collections," Dept. of Veterans Affairs Medical Center, Brecksville, Ohio, Mumps Computing, Jun. 1997, pp. 12–16.

Briere, Daniel and Chris Finn; "Footing the Bill," Network World, v9n21, May 25, 1992.

White, George C.; "Consumer Bill Payment—"Front End" Overview," White Papers, Inc., Apr. 22, 1992, 3 pages.

Pence, Daniel M.; "TV Answer," Electronic Payment Products, TV Answer, Inc., Reston, Virginia, 9 pages.

"New Technologies in Consumer Bill Payment," Scanfone by US Order, 9 pages.

Mila, Paul J., Director of Operations; "Online Resources," McLean, Virginia, 4 pages.

Pope, Dennis J., Asst. Vice President, EFT Project Manager, Manufacturers Hanover Trust Company, New York, New York, 5 pages.

White, George C.; "Bill Payment Initiation From Retail Stores," White Papers, Inc, Apr. 22, 1992, 2 pages.

"System and Method for Paying Bills Electronically," 7 pages.

Manelski, Dr. Dennis; "Bill & Pay Minitel– Consumer Bill Payments Overview," Minitel USA, 880 7$^{th}$ Ave., New York, NY, Apr. 22, 1992.

"More Diversity; Information Services Stress Partnerships," Communications Daily,v12n124, p. 2, Jun. 26, 1992, 2 pages.

"Account Acquisitions," A/S/M Communications, Inc., Adweek, May 3, 1993.

Youngblood, Dick, Staff Writer; "Some hung up about paying bills via computer," Star Tribune, Minneapolis, MN, May 23, 1993, 3 pages.
Alexander, Steve; "Community Link to shift its marketing focus from masses to special interest," UMI Inc., Aug. 13, 1993, 3 pages.
Oslund, John J., Staff Writer; "Ready to Score—Big Games Offers US West a Chance to Show Off New Information Service," Star Tribune, Jan. 24, 1992, 3 pages.
"Sprint Considers Single Bill," Communications Week, Dec. 24, 1990, p. 27.
Pfitsinger, William H.; "Consolidate Your Utility Bills . . . ," The American City, Aug. 1963, pp. 80–81.
"A Player Goes After Big Bucks in Cyberspace," American Banker, May 5, 1998.
Anonymous, "Another Player Enters the Bill Presentment Game (Online Resources & Communication teams with Electronic Funds & Data Corp and American Payment Systems to develop online bill presentment and bill payment service)", Report on Home Banking & Financial Services, v 2, n 12, p. 3, Mar. 28, 1997.
Anonymous, "Bold moves (First Data Corp and Microsoft Corp are forming bill–pay and bill–presentment company, challenging Visa, Integrion and Checkfree)", Cards International, n 181, p. 5., Jul. 31, 1997.
Anonymous, "Billers Benefits When the Bill's Not in the Mail", Bank Network News, V. 15, N. 8, pp. 4–5, Sep. 11, 1996.

Jones, D., "CHAPS–ring around the city", Journal: Banking World, vol. 1, No. 5, pp. 11–13, Nov. 1983.

"Sterling Commerce Announces New Consumer Payment Consolidation Software for Banks; Vector: Biller Lets Banks Solve Costly Manual Handling of Consumer Payment", Business Wire, p09160262, Sep. 16, 1996.

Large, Jack, "Which Method Should You Settle For?", Corporate Finance; London, Sep. 1997.

Mullin, Rick, "The Upward Evolution of Batch Automation", Chemical Week, vol. 161 Issue 37 , p39, 2p, 1 graph, 4c, Oct. 6, 1989.

Zabback et al., "Office Documents on a Database Kernel–Filing, Retrieval, and Archiving–", Database Research Group, Dept. of Computer Science Swiss Federal Institute of Technology, CH–8092 Zurich, pp. 261–270.

Orr, Bill; "Electronic bill paying shows signs of soaring," ABA Banking Journal, May 1997, pp. 42, 47–48, 50.

* cited by examiner

DISTRIBUTED ELECTRONIC BILLING SYSTEM WITH GATEWAY INTERFACING BILLER AND SERVICE CENTER

TECHNICAL FIELD

This invention relates to electronic billing systems. More particularly, this invention relates to gateways for reliably exchanging billing data and related information between billers and a third party billing service center, and for tracking the movement of such data and information.

BACKGROUND OF THE INVENTION

Essentially everyone is familiar with receiving bills. Every month, like clockwork, millions of consumers and businesses receive bills for goods and services. For convenience, the term "consumer" is used throughout this document to represent both a typical person who consumes goods and services as well as a business that consumes goods and services.

At the end of each billing cycle, a biller generates a bill or statement for each consumer account having a positive or negative account balance, or having transactions that yielded a zero balance. As used herein, a "biller" is any party that originates billing statements for goods or services rendered to the consumer. Examples of billers are utilities, government, merchants, and intermediate billing services such as banks. The billing statement is typically customized according to the biller's preferences. For example, it is common for billing statements to be printed on colored paper, display the biller's logo, provide a billing summary, and show itemized transactions. This information is organized in a custom format that is unique to and controlled by the biller.

The biller also creates remittance information that associates the consumer account with the bill and any payment toward the bill. The remittance information is typically in the form of a detachable stub or coupon that the consumer detaches from the billing statement and returns along with the payment. This remittance stub is also customized according to the biller's preferences.

With the growing popularity and use of personal finance computer software, it would be beneficial for billers to distribute their billing statements electronically and to receive payments electronically. Unfortunately, most of the finance computer software focuses primarily on bill payment, with some emphasis on electronic bill management, but with little innovation in bill distribution and presentment. Many of these systems still rely on delivery of paper bills through the U.S. mail.

There is a prior art electronic bill payment system, however, that mentions the possibility of electronic bill distribution. This system is described in U.S. Pat. No. 5,465,206, entitled "Electronic Bill Pay System," which issued Nov. 7, 1995 and is assigned to Visa International. The Visa bill payment system permits bills to be sent to consumers via U.S. mail or email. Unfortunately, the system is limited in that the email message containing the bill must conform to requirements imposed by Visa. The requirements stem from the need to route remittance information back to the biller through the VisaNet® network. The biller has little or no control over the format concerning how the bill is presented to the consumer, but must instead accommodate a format compatible with the VisaNet® network. While it may be possible for the biller and biller bank to agree on some aspects of the billing format, the biller cannot independently control the format.

It would therefore be advantageous to devise an electronic bill distribution system that enables the biller to directly control the format for presenting the bill.

Separate from the bill format matter, there is another problem facing acceptance of electronic bill distribution systems. Billers may not be capable of, or may not wish to engage in, the task of electronically distributing billing statements. From a biller perspective, it would be much more advantageous to contract with a billing service to handle the electronic bill distribution tasks. However, contracting with a third party raises additional concerns. It is in the interest of the billing service to standardize the electronic distribution process to efficiently achieve economies of scale. Yet, the biller prefers that its bills be presented in customized formats, rather than standardized formats. In the Visa system, for example, the biller gives up control and customization to participate in the electronic system. Thus, for an electronic bill distribution system to be successfully adopted, it should accommodate the biller preferences of individuality while simultaneously facilitating the billing service's interests of standardization.

Another design consideration is that many billers already have established sophisticated, expensive accounting systems. It would be beneficial to devise a bill distribution and remittance management system that integrates smoothly with entrenched accounting systems so that companies are not required to change their traditional ways of practice.

SUMMARY OF THE INVENTION

This invention concerns an electronic billing system and method for creating, designing, and distributing customized electronic billing statements. The electronic billing system provides a set of tools for a biller to create and design a customized billing statement. The biller independently controls the appearance and format of the billing statement. Once the statement is designed, the biller provides the statement format and billing information to a third party billing service center, which generates the electronic billing statements in the biller-designed format and electronically distributes the billing statements to consumers.

The billing system includes a biller integration system resident at each of the billers. The biller integration system is preferably a set of software tools that integrate with the biller's existing billing and accounting systems. The biller integration system includes a translator component to convert the billing data from the associated biller's existing billing system to an acceptable format. The biller integration system also includes a statement designer that enables the biller to create a billing statement template; a rules manager to establish rules for inclusion of particular data and information in the bill, and a resources manager to assist the biller in creating non-billing resources (e.g., logos, special offers, etc.).

To assist the biller in creating statement templates, the biller integration system maintains industry schema tables that are tailored to particular industries. The tables can be used to provide a default set of predefined billing categories for a given industry, which the biller might wish to use in its template. For example, an industry table for the energy industry might contain normal billing fields (e.g., amount due, due date, etc.) and industry-specific fields for energy consumption data such as previous meter reading, current meter reading, total number of kilowatts, and price per kilowatt. If the industry table contains sufficient fields for the biller's purpose, the biller need not create its own detail table containing customized billing categories. Alternatively, the biller can start with the industry table and add fields to customize the industry table.

The biller integration system sends the billing data, template, rules, and resources to the billing service center, where they are stored. The service center generates customized billing statements by inserting the data and resources into the template at the appropriate fields and accounting for the rules, and distributes the billing statements electronically to consumers.

The biller integration system and service center are each equipped with a gateway to facilitate the exchange of the statement template, the billing data, resources, and rules. Each gateway has a parcel manager to reliably transfer parcels and track the parcels as they go from one computer at the biller to another computer at the service center. Through this parcel handling and monitoring system, the biller integration system keeps the biller informed as to the location and status of the statement templates, the billing data, any forthcoming payments, and so forth.

BRIEF DESCRIPTION OF THE DRAWINGS

The same reference numbers are used throughout the figures to reference like components and features.

DETAILED DESCRIPTION

Figure 1:
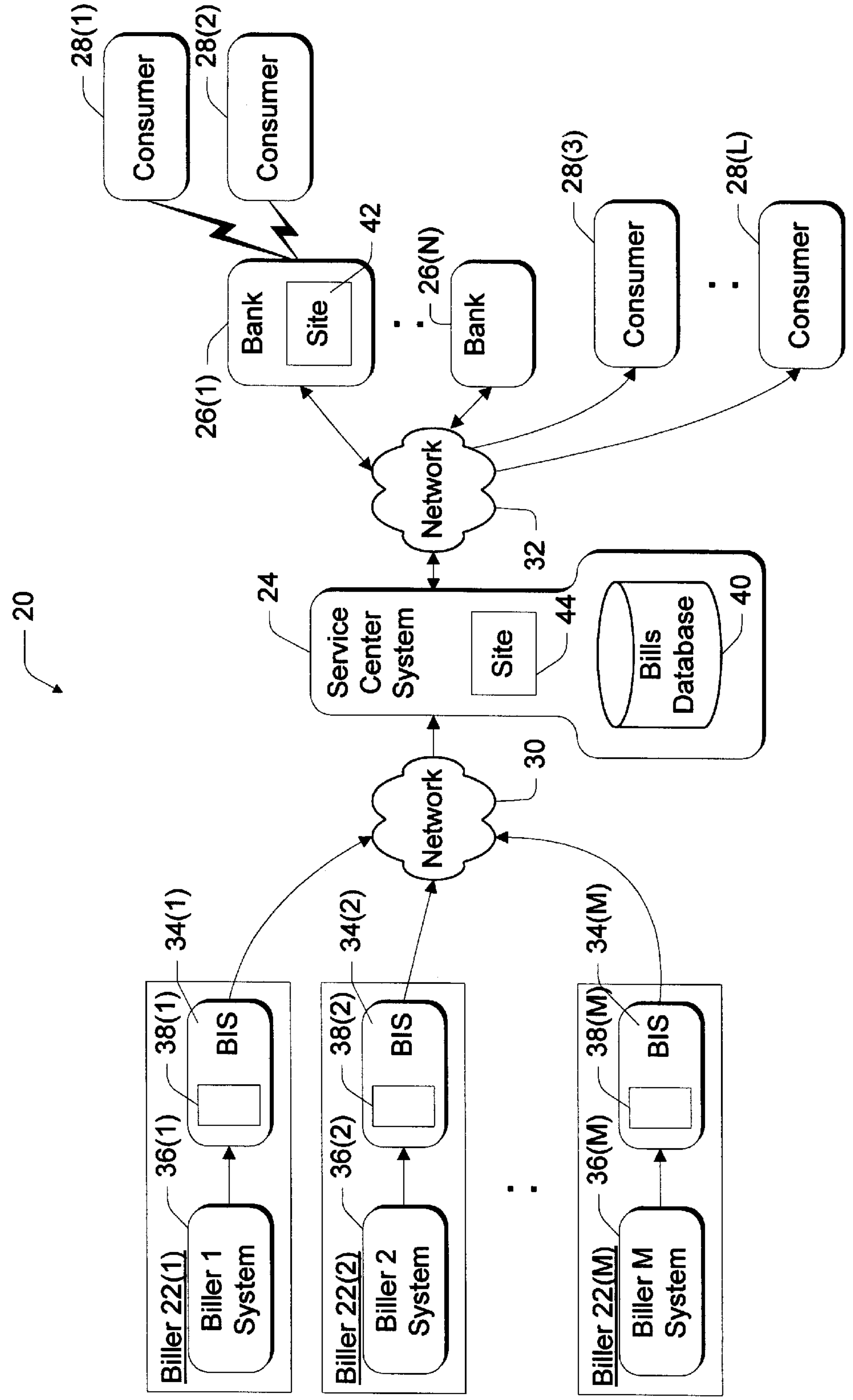
FIG. 1 is a diagrammatic illustration of an electronic billing system.

FIG. 1 shows an electronic billing system 20 that enables multiple billers to electronically distribute their billing statements to many consumers over a network, such as the Internet. The electronic billing system 20 has multiple participating billers 22(1), 22(2), . . . , 22(M), a service center system 24 resident at a third party billing service, multiple participating banks 26(1), 26(2), . . . , 22(N), and multiple consumers 28(1), 28(2), 28(3), . . . , 28(L).

The electronic billing system 20 facilitates distribution of bills over a data network, such as the Internet. In FIG. 1, a first data network 30 interconnects the billers 22(1)–22(M) with the service center system 24 and a second data network 32 interconnects the service center system 24 with the banks 26(1)–26(N). One or both of the networks 30 and 32, or parts of them, may be embodied as the Internet. One or both of the networks 30 and 32 may also be implemented in part as other types of data networks, such as proprietary WANs (wide area networks).

The billers 22(1)–22(M) are equipped with biller integration systems 34(1), 34(2), . . . , 34(M) that facilitate the design of templates for electronically renderable billing statements. The template and billing information are sent to the service center system 24 for electronic distribution of the billing statements. Each biller integration system (BIS) 34(1)–34(M) integrates with the billers' existing billing system 36(1), 36(2), . . . , 36(M). These billing systems are assumed to be computerized accounting systems that track consumer accounts and generate periodic billing statements. The billing systems 36 are further assumed to be different from one another, whereby each system is unique or customized to the biller's preferences and needs.

Each biller integration system 34(1)–34(M) is implemented with a translator 38(1), 38(2), . . . , 38(M), respectively, to integrate with the legacy billing systems 36(1)–36(M). Each translator 38(1)–38(M) is preferably a software component that is uniquely configured to translate billing data from a format used by the existing billing systems 36(1)–36(M) to a format compatible with the biller integration systems 34(1)–34(M). Since the billing systems 36(1)–36(M) are specialized to each particular biller, the translators 38(1)–38(M) are uniquely written for the corresponding legacy billing system of the biller.

The biller integration systems 34 enable the associated billers 22 to create a statement template for an electronically renderable customized billing statement. In a preferred implementation, the BIS 34 is a set of software tools that assist the biller in designing the template. The statement template specifies how the statement will present billing information to a consumer. For instance, the statement template includes various fields in which information will be inserted when the electronic billing statement is generated. As an example, one type of field in the template is a data field that holds billing data. As used herein, the term "billing data" generally means the consumer account information, such as the account number, the consumer's name and address, transaction items, amount due, interest amount, minimum payments, due date, and so forth.

Another type of template field is a resource field that holds resources. As used herein, a "resource" generally refers to non-billing data information, such as phone numbers for service information, advertisements, biller logos, regulatory messages, give-aways, and so forth. Since these bills are electronic, resources may be in the form of video clips, sound clips, pictures, and other such content. Yet another template field type is a conditional field, which holds information (data or resource) whose inclusion in the bill is conditional. For instance, the biller might wish to include in the bill some information on a savings plan for any consumer who spends more than a threshold amount each month. When a particular consumer satisfies that threshold, the savings plan information resource is automatically added to the electronic bill. Conditions may be satisfied by information requested by the biller or consumer profiles.

The template is preferably constructed using as Active Server Pages, a technology introduced by Microsoft Corporation. An active server page, or "ASP", allows a user to define templates using a combination of a hypertext language (e.g., HTML) and a scripting language, such as Visual Basic Script (or "VBS") or JScript from Microsoft Corporation, perl, python, REXX, or tcl. The HTML language defines the basic structure of the billing statement and the scripting language defines which data is inserted into the appropriate fields. The scripting instructions are set apart by special delimiters. When an ASP file is read and rendered, the scripting instructions within the delimiters are executed to fill in the billing data. The result is a billing statement in a pure hypertext document. Active Server Pages are described in documentation available from Microsoft's Web site "www.microsoft.com", under the section Internet Information Services. This text is hereby incorporated by reference.

Through the custom template design process, the biller independently controls the appearance and format of its billing statement. Moreover, with the inclusion of conditional fields, the biller can uniquely present different information to targeted consumer groups depending upon definable conditions.

Each biller integration system 34(1)–34(M) packages the statement template together with other billing information in a standardized file. More particularly, the file contains the statement template, the sample data, a set of rules defining the conditions for the conditional fields, and non-billing resources such as phone numbers for service information, advertisements, biller logos, regulatory messages, giveaways, and so forth. The file format is standardized in the sense that the service center system 24 expects to receive the same formats from each biller.

The account data is sent in separate batches independently of the template file. The account data may be sent to the billing service more frequently than changes to the templates and rules. For instance, the data may be sent as often as daily or twice daily, whereas the template and rules may be changed less frequently like once a month. The converse is also true, wherein the template file is sent more frequently than the account data.

The biller integration system 34 is described in more detail in co-pending U.S. patent application Ser. No. 880,125, entitled "System and Method for Designing and Distributing Customized Electronic Billing Statements". This application was filed Jun. 19, 1997 in the names of Howard Campbell, Warren T. Dent, Eric Jakstadt, Darren B. Remington, Bassam Saliba, Bert Speelpenning, George Webb, and is assigned to Microsoft Corporation. This application is incorporated by reference.

The service center system 24 has an electronic bill distribution system that electronically distributes the billing statements on behalf of the billers 22. The service center 24 receives the standardized files from the billers 22 and unpackages the statement template, rules, and resources. The service center 24 then generates the customized billing statements for each biller 22 from the statement template and the billing information received from that biller. The billing statements are stored in a bills database 40 and electronically distributed to the consumers over the network.

The service center delivers the billing statements in one of two ways. One way is to directly distribute the billing statements to the consumers over the network 32 (i.e., Internet), as illustrated by the communication paths to consumers 28(3) and 28(L). The billing statements can be embedded in an email message or a notice. A direct distribution system is described in U.S. patent application Ser. No. 08/734,518, entitled "Electronic Bill Presentment and Payment System", which was filed Oct. 18, 1996 in the names of Darren Remington and Warren Dent, and is assigned to Microsoft Corporation. This application is incorporated by reference.

A second way is to make the billing statements available at other network sites, such as a Web site 42 provided at the consumer's bank or a site 44 provided at the service center 24. The consumers 28(1)–28(L) access the bank's server or service center's server via universal resource locators that are assigned to the respective sites.

The consumers render the billing statements on their computer, typically on an electronically-capable screen and preferably through a graphical user interface (UI). The biller controls the exact information and format contained in the bill through the design of the template, and decisions as to what resources, data, and rules to include with the template.

Figure 2:
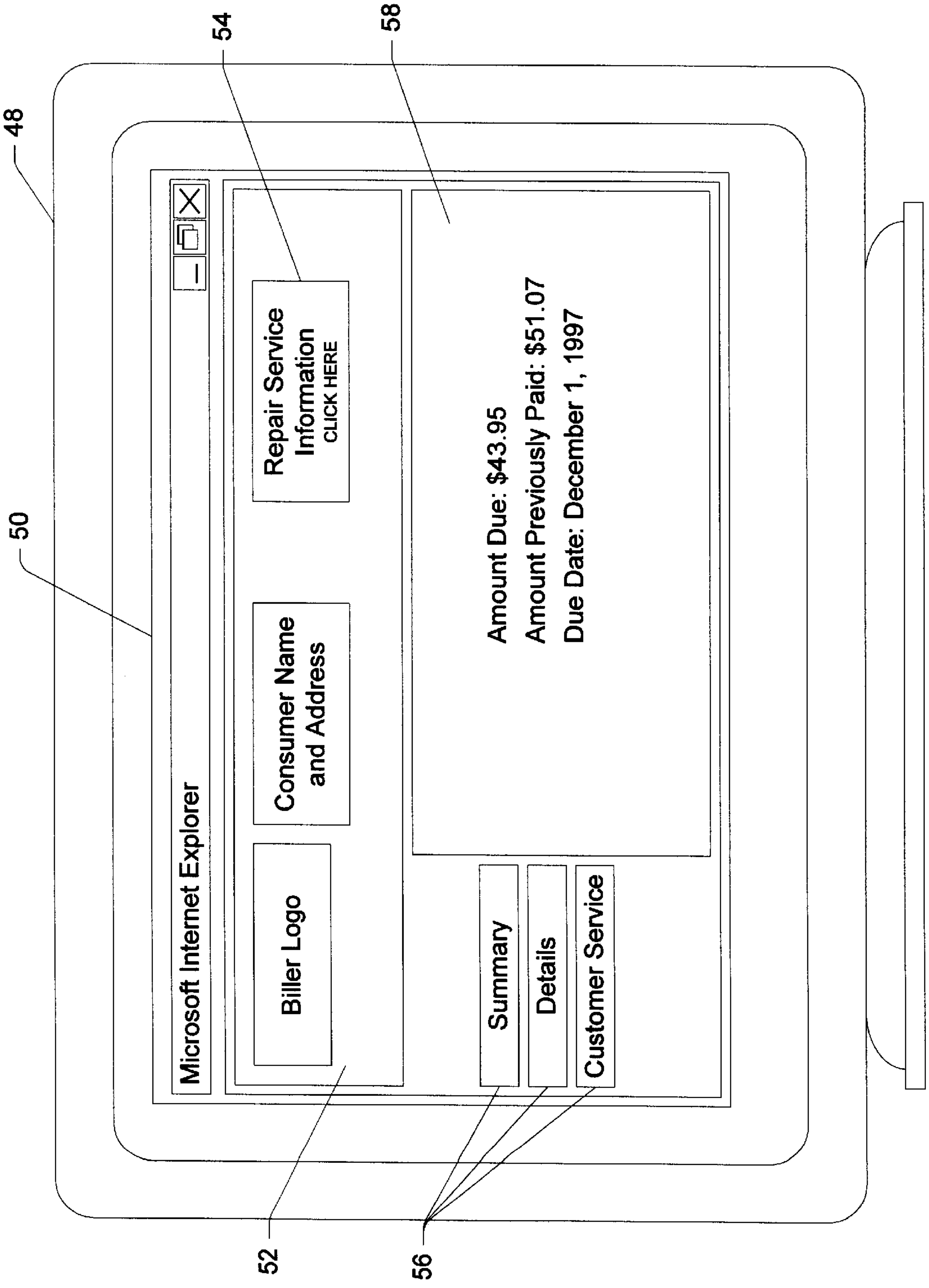
FIG. 2 is an example illustration of a graphical user interface window showing a billing statement.

FIG. 2 shows an example illustration of a graphical user interface with a billing statement 50 rendered on a consumer's home computer monitor 48. In this example, the billing statement 50 is written in a "markup language," such as HTML (Hypertext Markup Language). HTML is a subset of SGML (Standard Generalized Markup Language), a language formally defined as "a language for document representation that formalizes markup and frees it of system and processing dependencies." HTML documents are compatible with the World Wide Web. The HTML billing statement 50 can be rendered by an Internet browser application, such as the Internet Explorer browser from Microsoft Corporation, which executes on the consumer's computer.

The billing statement 50 is rendered according to the template design. In this example, the billing statement has a banner stripe 52 across the top of the screen to show biller and consumer information. The banner stripe 52 contains various fields, including a resource field for the logo resource and a data field for the consumer's name and address.

The banner strip may also contain a conditional field to hold advertisements, announcements, or other types of resources, as represented by the "Repair Service Information" resource 54. For instance, the biller might wish to display the "Repair Service Information" resource 54 only if the particular consumer has called the repair service twice in the past twelve months. The biller establishes a rule for the conditional field, which stipulates that the resource should only be placed in the field if the consumer records reflect that the consumer has called the repair service at least twice in the past year. If the consumer activates the resource, the consumer can communicate with a consumer services representative over the network, or alternatively the biller's consumer service group initiates a call to the consumer in a corresponding and analogous manner.

The billing statement 50 has multiple softkeys or buttons 56 that form tabbed navigation points to facilitate quick movement from one section of the bill to another. In this example, there is a "Summary" tab that references the billing page shown in the figure. Activation of a "Details" tab (via a mouse pointer, for example) changes the screen from the summary page to one or more pages itemizing the billing transactions. A "Consumer Service" tab switches to a page giving instructions on how to access consumer service.

The billing statement 50 has a main body 58 that contains numerous data fields for the billing particulars. On the summary page of the energy bill, the billing data fields in body 58 include an amount due, an amount previously paid, and a payment due date. On the "Details" page, the data fields in the body 58 might include line items detailing a purchase date, purchase order number, invoice number, item number, description of item, quantity, price, total, tax, and amount due.

The billing statement in FIG. 2 is merely one example. There are infinitely many ways to organize and present data.

In addition, the billing statement may contain other items, such as embedded hyperlinks, executable code, and pop-up dialog boxes, which provide additional design flexibility and customization. The biller can essentially create any aesthetics, organization, and detail that it prefers.

The consumer can elect to pay the bill electronically, as well. The payment phase of the billing system, as well as the settlement phase, are not discussed in this document. An entire electronic billing system is described in U.S. patent application Ser. No. 08/734,518, entitled "Electronic Bill Presentment and Payment System", which was filed Oct. 18, 1996 in the names of Darren Remington and Warren Dent, and is assigned to Microsoft Corporation. This application is incorporated by reference.

Biller Integration System

Figure 3:
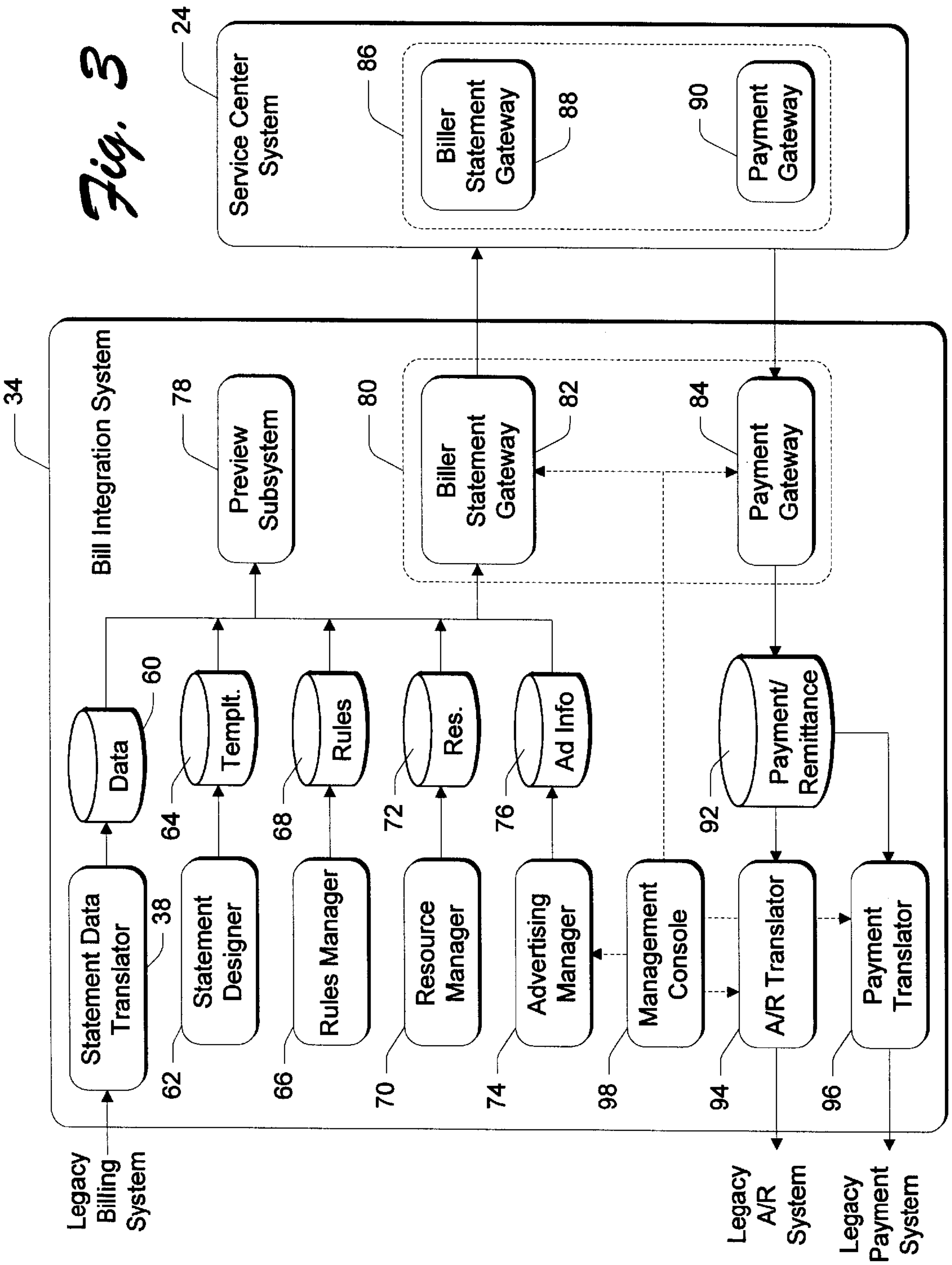
FIG. 3 is a diagrammatic illustration of a biller integration system employed in the electronic billing system.

FIG. 3 shows a biller integration system 34 in more detail. It includes the translator 38 to convert the billing data from the biller's legacy billing system into data acceptable to the BIS 34 and service center 24, and a database 60 to hold the converted billing data. As one example implementation, the translator 38 is configured to intercept printer data file that is destined for a printer or database. The printer data file is formatted for printing paper bills, as is conventional for the biller. The translator 38 extracts the raw billing data from the printer data file and creates a new file that is saved in database 60. It is this new file that is sent over to the service center for incorporation into the template.

The BIS 34 also includes a statement designer 62 to create and design the statement template. The statement designer 62 enables the biller to embed and organize data fields, resource fields, and conditional fields within the statement template and to associate the respective billing data, resources, and rules with the fields. The statement designer 62 preferably supports a graphical user interface that presents the statement template to the biller during construction. After the template is finished, it is stored as a template file in a template store 64.

The BIS 34 has a rules manager 66 to establish the rules for inclusion or exclusion of resources in the billing statement. The rules manager 66 associates the particular data or resources with the conditional fields in the statement template and defines the conditions under which the data or resources are inserted into the conditional fields. When the service center generates the electronic billing statements, the statements in which the conditions are met will contain the associated data or resources while the statements in which the conditions are not met will not contain any associated data or resources. The rules set by the rules manager 66 are stored in a rules store 68.

The BIS 34 has a resource manager 70 to assist the biller in creating the resources and a resource store 72 to keep the resources. The resources may be in the form of text files, graphics files, audio files, video files, and the like. The BIS 34 further includes an advertising manager 74 to help create advertisements to be included in billing statements, and an advertisement store 76 to hold the advertisements.

A preview subsystem 78 is incorporated into the biller integration system 34 to allow the biller to preview how a sample billing statement will appear. The preview subsystem 78 retrieves the template from the template store 64 and uses sample data (which is included within the embedded fields of the template) to generate a sample billing statement. The sample is displayed on a computer screen for the biller to review and analyze the statement's appearance.

A BIS gateway 80 facilitates data communication with the service center 24. The BIS gateway includes a statement gateway component 82 and a payment gateway component 84. The statement gateway 82 bundles together and packages the template, rules, and resources (including advertisements) and sends the package to the service center 24 for generation and distribution of the electronic billing statements. As noted above, the package is preferably constructed in a data file that is standardized for convenient handling the by service center. The statement gateway 82 also sends batches of data over to the service center 24.

The service center 24 has its own gateway 86 with a statement gateway component 88 and a payment gateway component 90. The statement gateway component 88 unpackages the file received from the biller and stores the template, rules, and resources in a database. The service center 24 uses the template, rules, and resources to create customized billing statements on behalf of the biller, and merges the data with the templates to form billing statements for individual consumers on demand. One example of a billing statement is shown in FIG. 2. The service center 24 distributes the billing statements electronically over the network, or alternatively makes them available on its site or accessible by consumer bank sites.

The consumers review their bills and determine whether to pay all, part, or none of the bill. The consumer may also elect to submit a challenge or comment on a particular billing item, or on the statement as a whole. The consumer returns whatever payment, along any additional information and the automatically created remittance data, electronically over the network to the service center 24.

The service center 24 receives the payment and bundles various payments destined for individual billers into batch disbursements for those billers. The service center disburses to each biller a single settlement transaction listing all payments that are funded from the various consumers. The settlement information contains data on each payment contained in the disbursement batch, such as consumer's name, consumer's account number, payment amount, designated payment date, and so forth. The service center also facilitates payment of funds into the billers' accounts.

For each biller, the payment gateway component 90 at the service center packages the settlement transaction and forwards it back to the corresponding payment gateway component 84 at the BIS gateway 80. The settlement information is stored in a payment/remittance database 92. The BIS 34 has an accounts receivable (A/R) translator 94 and a payment translator 96 to convert the payment and remittance data received from the service center 24 back into a format that is compatible with the biller's legacy accounts receivable system and payment system.

A management console 98 allows an operator to manage the flow of data between the biller and the service center 24. The management console 98 is a software program that interfaces with the BIS gateway 80, the advertising manager 74, the A/R translator 94, the payment translator 96. The management console 98 supports a graphical user interface (UI) that enables the operator to track the flow of the statement file from the biller to the service center, and to track any return payments received from the service center.

Figure 4:
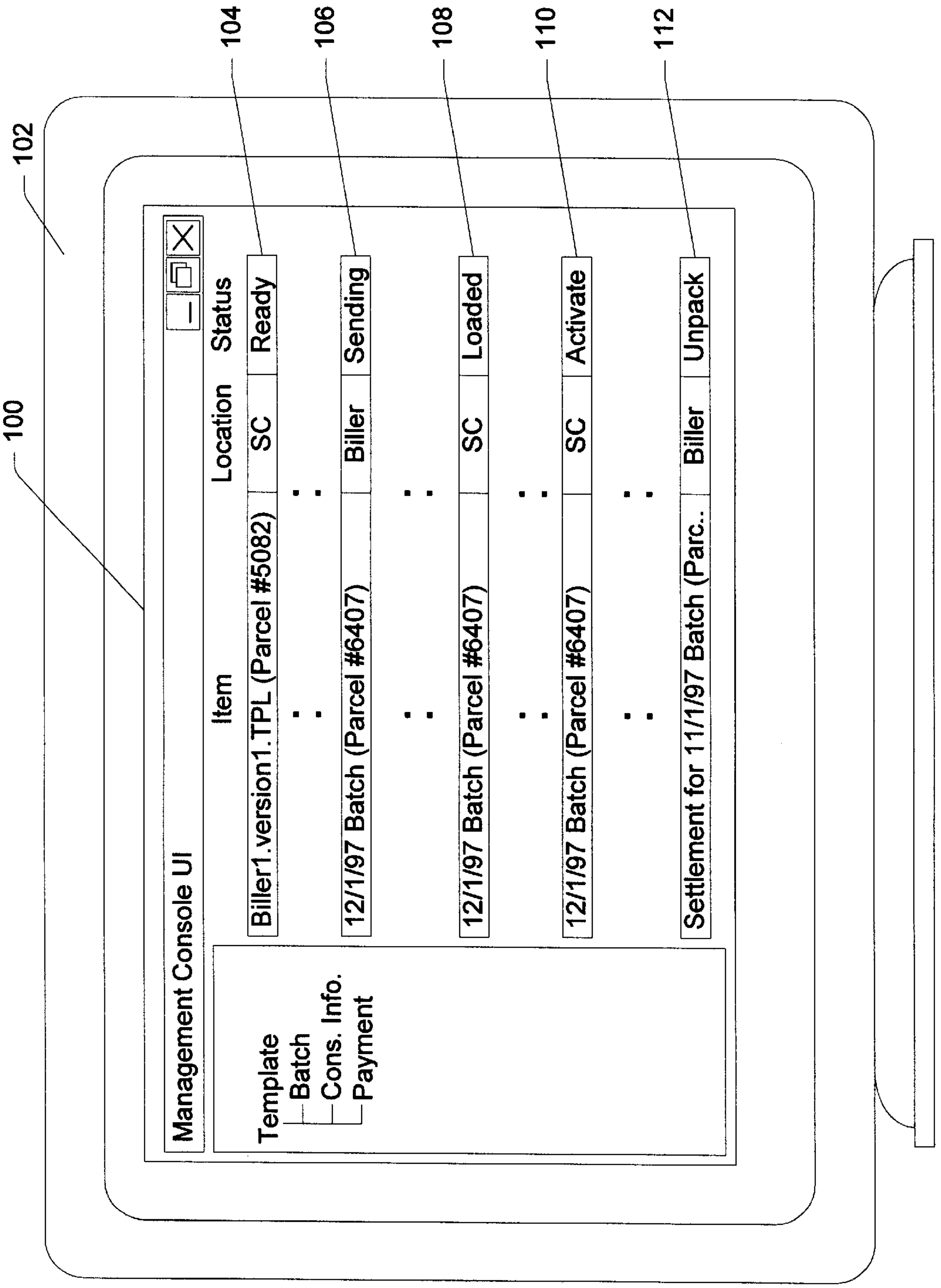
FIG. 4 is an example illustration of a graphical user interface window supported by a management console that shows a screen used to track parcels traveling between a biller and a third party billing service center.

FIG. 4 shows an example of a graphical user interface 100 supported by the management console 98 when rendered on a computer monitor 102. The management console UI 100 tracks data items being exchanged with the service center one-by-one. The UI identifies the data item, its present location, and the status of that item. As indicated by entry 104, version 1 of the statement template for biller 1 is located at the service center (SC) and has a status "ready" indicating that it is ready for use with billing data.

At the end of the billing cycle, the biller batches together the billing data for its consumers and sends it across the network to the service center 24. This billing data is then sent separately to the service center, which then creates billing statements from the data and the template, rules, and resources that are already on file at the service center. Entry 106 indicates that the batch of billing data for the period ending Dec. 1, 1997 is located at the biller and is currently being packaged and sent to the service center. A subsequent entry 108 informs the operator that the Dec. 1, 1997 batch has been received at the service center and is being loaded into the database.

At this point, the billing operator may wish to preview the billing statements prior to allowing the service center to disburse them electronically. The statements contain the newest billing data integrated into the template to create the final bills. The billing operator can preview a statistically-significant sample of the bills as they will appear to the consumer. Once the billing operator has approved the statements, the operator sends over an activation command authorizing release of the billing statements. Entry 110 reflects that the status of the Dec. 1, 1997 batch has been upgraded to "Activate". Active statements can be disbursed electronically to the consumers or posted to the Web site.

The UI 100 also tracks receipt of payment at the service center and disbursement to the biller. After consumers begin paying their bills, the service center batches the payments into a single settlement transaction. Entry 112 indicates that a settlement transaction for the previous month's batch is presently located at the biller and is being unpackaged for transfer to the biller's legacy A/R system.

Gateway

Figure 5:
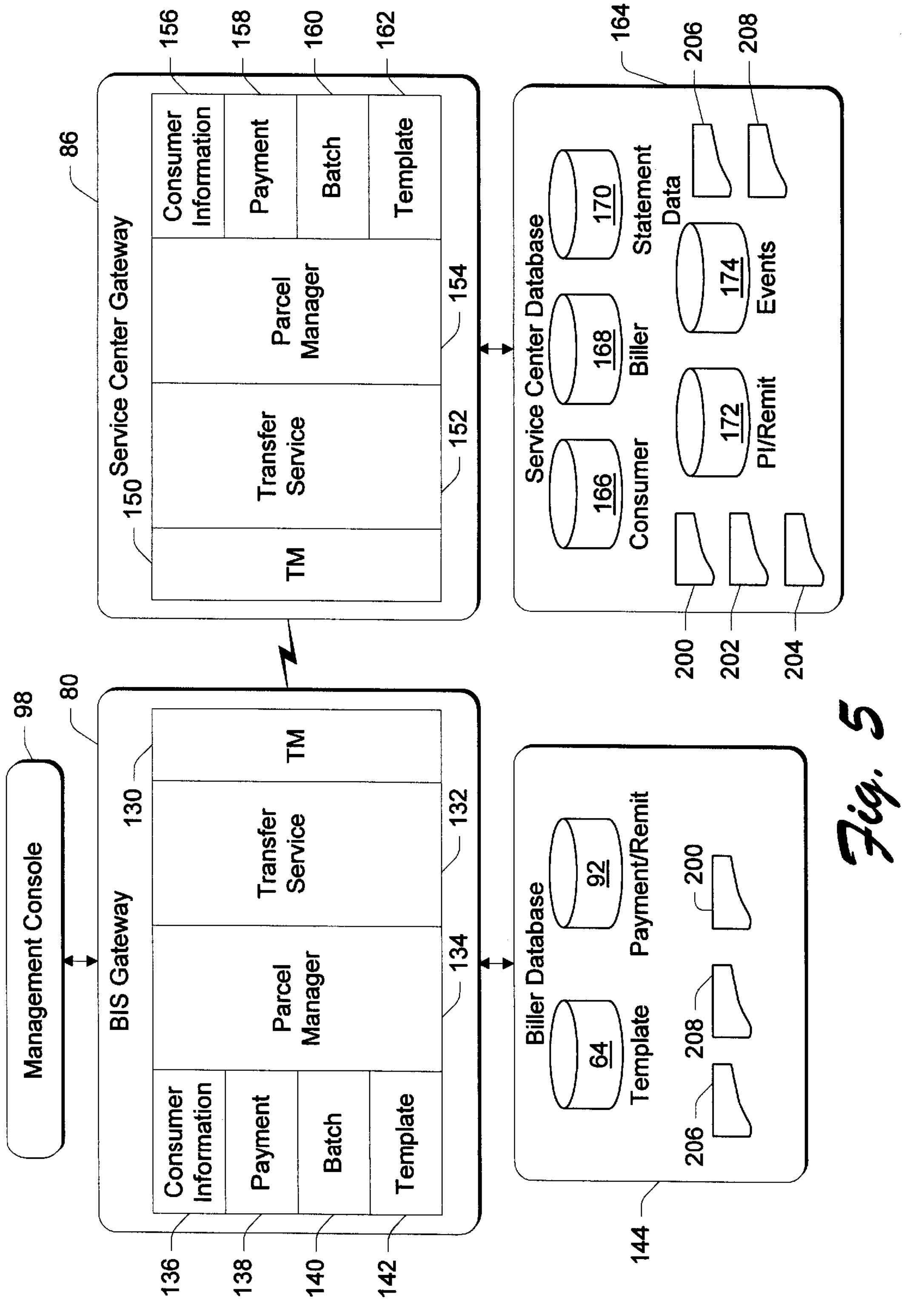
FIG. 5 is a diagrammatic illustration of gateways used to exchange the parcels.

FIG. 5 shows the BIS gateway 80 and the service center gateway 86 in more detail. The two gateways 80 and 86 are very similar in that they include essentially the same software modules. The BIS gateway 80 is explained in detail, while the service center gateway 86 is given cursory reference.

The BIS gateway 80 transfers and receives bytes of data using a low level transport mechanism 130. The transport mechanism 130 can be implemented, for example, as a file system or as a message queuing service, such as MS Message Queuing (MSMQ) from Microsoft Corporation. The BIS gateway 80 has a transfer service 132 that provides an API (application program interface) wrapper to the transport mechanism. The transfer service 132 abstracts out the underlying transport mechanism 130 so that the data can be suitably transferred over the network using different mechanisms. The transfer service 132 includes APIs that the billing data to be saved to a file and copied from the BIS to the service center using conventional file system procedures. The transfer system 132 might also include an API that packets the billing data into individual messages that are sent over the network to the service center.

The BIS gateway 80 has a parcel manager 134 to transfer billing data and other information from the BIS to the service center. The parcel manager transfers the data in "parcels". The parcel manager 134 is responsible for reliably transferring parcels from the BIS 34 to the service center and tracking the parcels as they go from computer to computer. It is this tracking function that enables the management console UI 100 to show the location and status of particular parcels. The parcel manager 134 is described below in more detail with reference to FIG. 7.

Atop the parcel manager 134 are a set of handlers that collectively form an enterprise interface into the parcel manager. The interface handlers handle requests to create different types of parcels, depending upon the type of information being transferred to the service center. The enterprise interface handlers include a consumer information handler 136, a payment handler 138, a batch handler 140, and a template handler 142. The handlers facilitate creation of particularized parcels for shipment to the service center. For instance, the batch handler 140 facilitates creation of statement batch parcel to be transferred to the service center. The handlers 136–142 are preferably implemented as COM (component object model) objects and are called via a set of enterprise integration APIs.

The BIS 34 has a database 144 to store the payment/remittance information 92, as well as other billing-related information such as the template versions 64. The database 144 correlates the payment/remittance information through a set of relational tables with columns for the biller, biller ID, consumer, consumer account, payment amount, amount paid, due date, date paid, any challenges, and so forth. The database 144 is preferably implemented using relational database software, such as SQL Server from Microsoft Corporation.

The service center gateway 86 has essentially the same modules, including a transport mechanism 150, a transfer system 152, a parcel manager 154, a consumer information handler 156, a payment handler 158, a batch handler 160, and a template handler 162. The service center gateway 86 is coupled to a database 164, which stores such data as consumer records 166 (account number, name, address, telephone number, etc.), biller records 168 (biller ID, biller address, biller account, biller bank ID, etc.), statement data 170, payment instructions/remittance information 172, and event information 174.

This latter data category—event information—includes the information used to track progress of individual billing statements and payments thereto as they work their way through the entire bill distribution, presentment, and payment process. Each step along the way is marked as an event. For instance, one event occurs when the biller sends the statement data to the service center. Another event occurs when the data is loaded into the statement database 170. Another event occurs when the biller activates the statement data. Another event occurs when the billing statements are disbursed to consumers. Another event occurs when a payment instruction is received from the consumer. Operators at the service center or biller use the events stored in the events database 174 to track the location and status of particular billing statements or payments.

Figure 6:
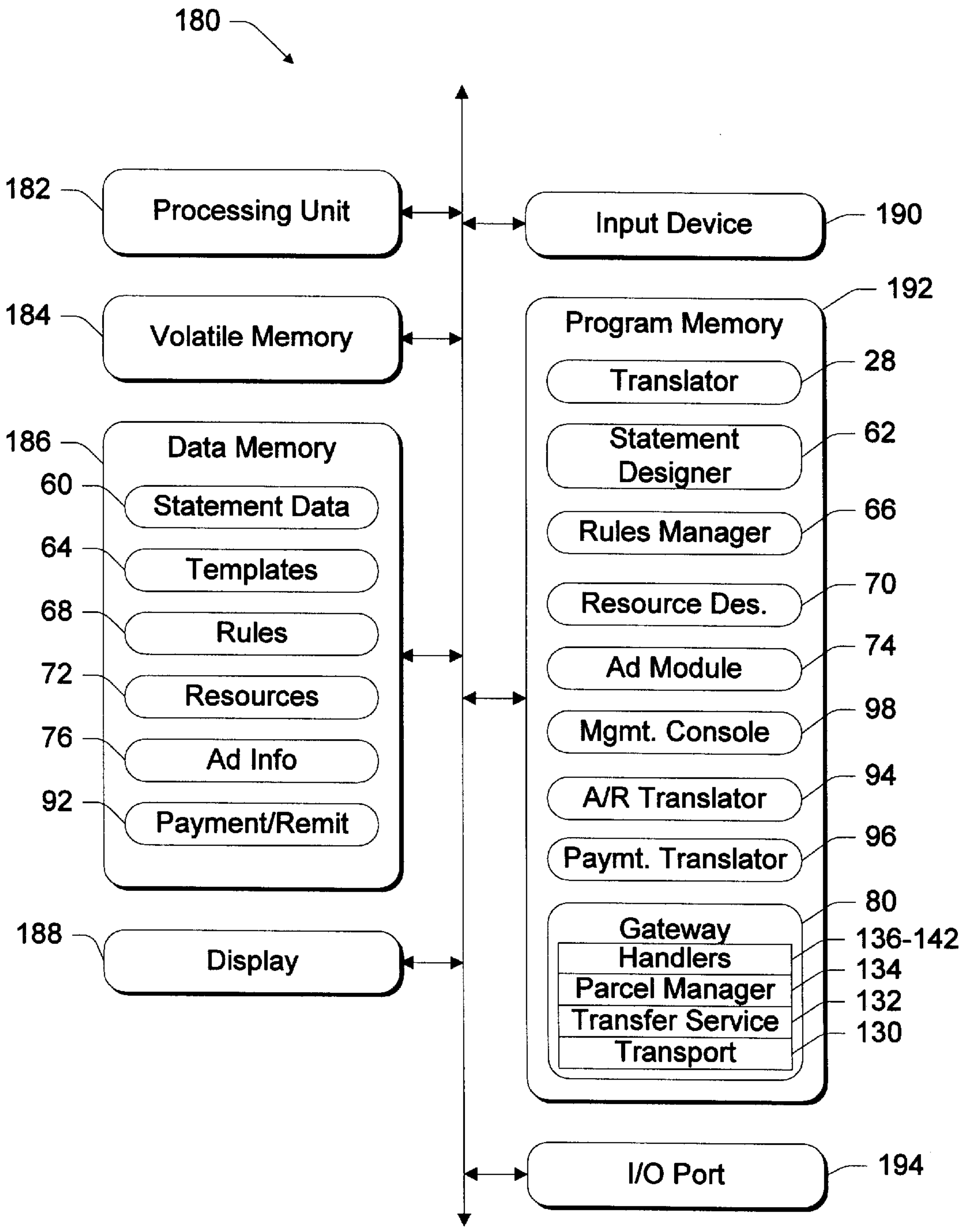
FIG. 6 is a block diagram of a biller computer that implements the biller integration system of FIG. 3.

FIG. 6 shows the biller integration system 34 implemented on a computing system 180. The biller's computing system 180 includes a processing unit 182, a volatile memory 184 (e.g., RAM), the non-volatile database memory 186 (e.g., disk drive, tape, disk array, etc.), a display 188, an input device 190 (e.g., keyboard, mouse, track ball, stylus, etc.), a non-volatile program memory 192 (e.g., ROM, disk drive, CD-ROM, etc.), and an I/O port 194 (e.g., modem, network card, ISDN connection, etc.). The computer components are interconnected by an electronic interconnect structure which consists of parallel and serial conductors, such as SCSI-, PCI-, and RS 232-compatible conductors. The biller's computer system 180 runs an operating system (not shown) which supports multiple applications. The operating system is stored on the memory 192 and executes on the processing unit 182. The operating system is preferably a multitasking operating system that allows simultaneous execution of multiple applications. One preferred operating system is a Windows brand operating system sold by Microsoft Corporation, such as Windows 95, Windows NT, or other derivative versions of Windows.

As an example, the biller computing system 180 is implemented as a conventional personal computer (PC) or workstation, or a cluster of PCs, which are configured to run the Windows NT server operating system from Microsoft Corporation. Alternatively, the biller computing system might be implemented as UNIX-based computers or as mainframe computers.

The BIS 34 is implemented as software modules stored in program memory 192. The modules—billing data translator module 28, statement designer module 62, rules manager module 66, resource manager module 70, and advertising manager module 74, management console module 98, accounts receivable translator module 94, payment translator module, and gateway 80—run on the operating system. In a preferred implementation, the resource manager 70 and advertising manager 74 are implemented as HTML development software, such as Visual InterDev from Microsoft Corporation. The statement designer 62 and the rules manager 66 are implemented as extensions of the Visual InterDev software. The billing data 60, templates 64, rules 68, resources 72, advertising information 76, and payment/remittance information 92 are stored in the data memory 186.

Core Tables

With reference again to FIG. 5, the service center maintains a minimum set of core database tables to facilitate electronic distribution of billing statements from numerous different billers, to facilitate receipt of payment from numerous groups, and to facilitate disbursement and settlement of the payment back to the appropriate billers. The core tables correlate different database records in the service center database 164. In one implementation, there are three core tables at the service center: a statement table 200, a batch table 202, and a resource table 204. These tables pull records from one or more storage files, such as the consumer records 166, biller records 168, statement data 170, and payment instructions/remittance information 172.

The statement table 200 organizes the billing data and information used to generate individual statements. For example, the statement table 200 contains data fields for a biller ID to uniquely identify the particular biller, a statement ID to uniquely identify a statement for a given biller, a batch ID to identify the batch of billing data, a consumer ID to uniquely identify a consumer, a date on which the billing period begins, a date on which the billing period ends, a due date, a statement date, an amount due, a minimum payment due, a previous balance due, a past due amount, and an account number. Instances of the statement table are resident at the biller integration systems at the billers, as represented by table 200 on the biller database 144.

The batch table 202 organizes batches of billing statement data submitted by the billers for use in generating billing statements. The batch table 202 contains, for example, data fields for a biller ID, a batch ID, a template ID to identify which statement template version is to be used for statement creation, and a template rule ID to identify which rules should be applied for this batch of statement data.

The resource table 204 coordinates the resources that are to be included in the batch of billing statements. The resource table 204 includes such data fields as a biller ID, a batch ID, a resource ID to identify the particular resource (e.g., a "repair" control or discount offering), and resource value that specifies an amount level at which the resource should be offered to a consumer. As an example, the biller might stipulate to include a resource that offers a discounted cruise to any consumer who routinely spends $2000 per month.

Biller-Defined Details Tables

The biller-based BIS maintains its own set of tables that are separate from the tables at the service center. As noted above, the BIS 34 also maintains a copy of the statement table 200, which holds the same summary statement data as found at the service center.

The BIS 34 also enables the biller to define one or more details tables 206 in the relational database 144. In this manner, individual billers can tailor a new table to hold billing items that are particular to the biller's business practices. The biller defines the fields and the contents. For instance, a credit card company may want to devise a line item table that itemizes purchases made by the consumer. The line item table may include fields for purchase date, store name, item number, and cost of item.

The biller designs into the template the appropriate links to the custom details tables. The credit card company, for example, constructs a template that requests line items from the line item table for each individual consumer during statement generation. The biller sends the line item table as part of the statement data through the gateways to the service center for storage on the service center database 164. To construct a single consumer's statement on behalf of a particular biller, the service center runs the template with the designated template ID and uses the biller ID, statement ID, and line item ID as keys to the general statement table and line item table.

Industry Schema Tables

The BIS 34 and service center system 24 also support industry schema tables 208, which are tailored to particular industries. Companies within the same industry are expected to collect billing data and other information in many of the same categories. Each industry table 208 contains predefined industry-specific categories that are common across a particular industry.

For instance, many credit card companies might want to have a table dedicated to the item-by-item information that they typically include in a statement. A credit card industry table might hold such industry-specific fields to support this item-by-item presentation, such as categories for purchase date, store name, item number, and cost of item. As another example, many energy companies might want a special table with special fields for energy consumption data, such as previous meter reading, current meter reading, total number of kilowatts, and price per kilowatt.

The industry table 208 provides a default set of categories that the statement designer can use when creating the template. A credit card company, for example, can select from the predefined categories in the credit card industry table when designing the details section of the bill, rather than developing its own set of categories.

The industry table 208 also holds and organizes the billing data fitting the categories therein. When the statement data translator converts the billing data from the legacy billing system into a format for the BIS, the categories of data particularized to the company may be placed in the industry table 208 apart from, or in addition to, the statement table 200.

If the industry table 208 contains all of the fields used by the biller, the biller need not define its own details table 206. Instead, the biller simply invokes the industry table, which can then be used in place of any specially contrived details table. Alternatively, the biller can start with the industry table 208 and add fields to customize the industry table, resulting in a special details table. For example, an energy company that offers a savings plan to keep payments approximately constant in high consumption winter times and low consumption summer times might begin with the energy industry table and add extra fields showing an overage or underage of amount owed as a result of complying with the savings plan. In this manner, the industry schema tables 208 function like form tables that can be opened as used by the biller, or modified as the biller chooses.

Replicas of the industry table 208 and details 206 are maintained at the service center. The BIS transfers the tables as part of the batch process so that the service center has the necessary data to generate billing statements on behalf of the biller.

The categories employed in the industry tables 208 can be revised from time-to-time by the service center to present more tailored versions for industries or to keep up with changing industry requirements. Updated industry tables are conveniently downloaded to the billers to replace out of date versions.

Parcel Manager

The parcel manager 134 tracks and moves data (such as a batch of statements, a template, or a payment information) between the BIS gateway 80 and the service center gateway 86. Multiple instances of the parcel manager can coexist on the same computer and/or at the same site. The parcel manager 134 tracks both the transfer state of the parcel and the state of the contents within the parcel. In one implementation, the parcel manager 134 tracks ten different transfer states:

1. Initial parcel state
2. Parcel is waiting for construction
3. Parcel is under construction
4. Parcel in queue waiting to be transferred
5. Transferring parcel
6. Parcel is done with transfer and waiting to be received
7. Receiving parcel
8. Receiving complete
9. Application received the data from the parcel and successfully processed it
10. Application received the data from the parcel but failed to process it With respect to the content state, the parcel manager 134 tracks such events as whether the billing data is loaded on the service center database 144, whether a batch of billing data has been processed by the service center, whether the biller has activated the batch, and so forth. The content state is made available to applications interested in a parcel.

The parcel manager 134 enables the capabilities to move a parcel between the BIS and service center and to persistently track all activities associated with the parcel. The parcel manager 134 is fundamentally a wrapper on the transfer service 132 and transport layer 130. However, the parcel manager 134 does not depend specifically on the underlying transport mechanism (e.g., MSMQ or file system). As a result, the actual transport mechanism is abstracted from the parcel manager, enabling the parcel manager to operate with different types of messaging systems.

A parcel is a collection of objects that are sent together as a logical unit. A parcel may consist of multiple parcel components as defined by the application level. Thus a batch consisting of multiple tables would probably be transmitted as a single parcel where each table would be implemented as a parcel component. Through this abstraction, the parcel manager 134 can support many different parcel types and new parcel types.

The parcel manager 134 generates bulletins to provide information about the status and contents of a parcel. Although a parcel is transmitted only once, there may be many bulletins (in both directions) updating the state of the parcel and its contents. Subsequent actions on the parcel data (e.g., a batch is activated, etc.) result in the generation of new bulletins to inform the sending system of status changes. Bulletin contents are defined at the application level and are transmitted on behalf of the application(s) by the parcel manager.

Figure 7:
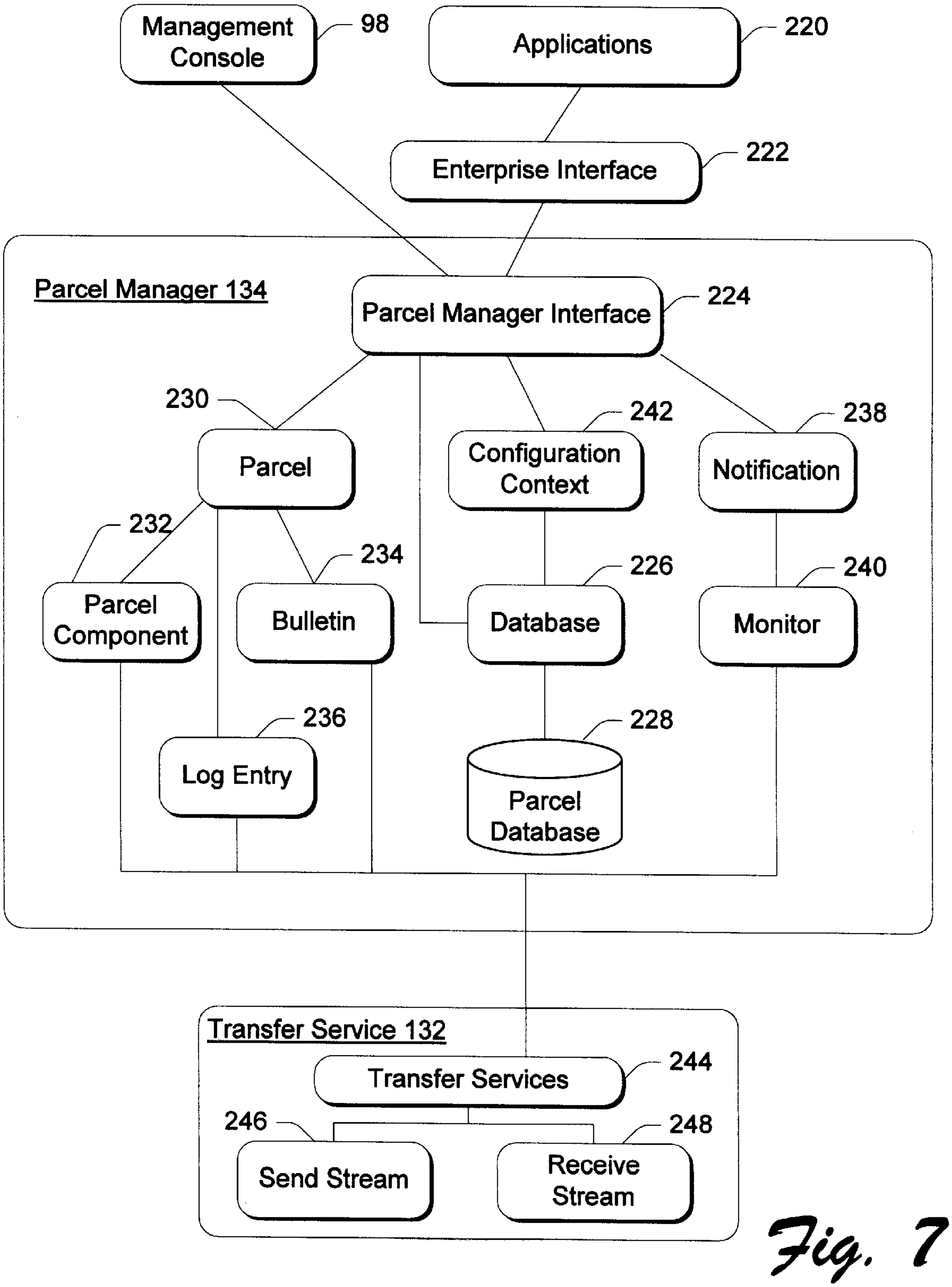
FIG. 7 shows the software architecture of a parcel manager, which forms part of the gateway illustrated in FIG. 5.

FIG. 7 shows the BIS parcel manager 134 in more detail. Applications 220 running at the biller computer system use the parcel manager 134 to create a parcel, send the parcel across to a computer at the service center, and receive notifications on the status and location of the parcel as it moves from one machine to another. Applications 200 interface with the parcel manager 134 via the APIs in the enterprise interface 222, which consists of the consumer information handler 136, the payment handler 138, the batch handler 140, and the template handler 142 (see FIG. 5). The management console 98 works with the parcel manager 134 to track the parcels between computers. It is noted that the parcel manager 154 residing at the service center gateway 86 is essentially the same, and is not described in detail.

The parcel manager 134 has a parcel manager interface object 224 that provides an interface into the parcel manager and its subordinate objects. Table 1 lists the methods supported by the parcel manager object 224.

TABLE 1

Methods of Parcel Manager Interface Object 224

| Name | Description |
|---|---|
| Parcels | Parcel enumerator. |
| ParcelsByState | Parcel enumerator for searching parcels based on state. |
| ParcelsByDate | Parcel enumerator for searching parcels based on date. |
| ParcelsByInfo | Parcel enumerator to list parcels based on application supplied information. |
| ParcelsByCertified | Parcel enumerator to list parcels based on certified parcel information. |
| FindParcel | Retrieves a specific parcel from the parcel database. Unlike the above parcel collection methods, FindParcel returns an actual Parcel object. |
| CreateNewParcel | Used to generate a new parcel by an application that wants to send data. Returns a pointer to the newly created parcel. |
| ConfigContexts | Enumeration method to list all configurations on the machine. Will only return configuration context records that match the parcel manager's context. |
| AllConfigContexts | Enumeration method to list all configurations on the machine, regardless of the parcel manager's context. |
| FindConfigContext | Finds the appropriate configuration object in the Parcel Manager's configuration table. Returns the ConfigContext object. |
| NewConfigContext | Creates a new entry in the Configuration table. |
| ParcelLogEntries | Enumeration method to list all parcel entries based on date range. |

TABLE 1-continued

Methods of Parcel Manager Interface Object 224

| Name | Description |
|---|---|
| BulletinLogEntries | Enumeration method to list all bulletin entries based on date range. |
| StartNotification | Starts a notification process and adds the specifics. All variant parameters are optional. If a notification process is already running, the new notification is added to its list. The method returns a handle so that the notification can be explicitly canceled. |
| BroadcastParcels | Causes the parcel manager to recreate a remote parcel database by sending updates on all parcels and by resending all bulletins. |
| StopNotification | Removes the specified notification from the notification process's list of notifications. |
| ClearErrors | Removes any errors stored in the parcel manager's errors collection. |
| ResendCertifiedParcels | Resends all certified parcels that have not been marked as fully processed. |
| IsLineUp | Checks via MSMQ to see if the connection with the service center is up. |

The BIS parcel manager 134 has a database object 226 that provides a wrapper to a parcel database 228. The parcel database 228 holds tables used to identify and track parcels as they are created and moved from one machine to another. Each parcel is assigned a unique parcel number upon creation and the parcel number can be used to index the tables. A parcel only travels in one direction from one computer to another. Once the parcel is received and its contents removed, the parcel is removed from the table.

As an exemplary implementation, the parcel database 228 holds six different types of database tables: a parcel table, a bulletin table, a detail message table, a parcel log table, bulletin log table, and a configuration context table. The "parcel" table contains such fields as parcel ID, parcel type, creation date, transfer state, date of transfer state, transfer address, content state, date of content state, sending computer ID, receiving computer ID, and context ID. The "bulletin" table contains such fields as parcel ID, bulletin ID, bulletin creation date, bulletin type, detail type, bulletin transfer state, and date of bulletin transfer state. The "detail message" table contains such fields as bulletin ID and the actual textual or binary data.

The "parcel log" table contains such fields as parcel ID, event data, type, and state. The "bulletin log" table contains such fields as parcel ID, bulleting creation date, event date, and bulletin transfer state. The "configuration context" table contains such fields as Context ID, parcel type, context type, sending channel, receiving channel, and BIS master channel.

When an application desires to create a parcel, it calls CreateNewParcel at the parcel manager interface 224. A parcel object 230 is created as a result. The parcel object is used for multiple purposes, including:

1. Sending data. Data is broken into one or more parcel components as is appropriate for the application. This task employs the methods CreateParcelComponent and CommitSend in Table 3 below.
2. Obtain and update parcel status information using methods UpdateInfo, Bulletins, and LogEntries from Table 3.
3. Send additional data in the form of bulletins, using the CreateBulletin method.
4. Receive data using methods ReceiveParcel and CommitReceive. Tables 2–4 list the properties, methods, and internal methods of the parcel object 230, respectively.

TABLE 2

Properties of Parcel Object 230

| Name | put/get | Description |
|---|---|---|
| ParcelID | get | Unique parcel identifier |
| ParcelType | get | Specifies parcel type. |
| ParcelTypeVersion | get | Type specific application level version. Used by the application to enforce parcel component structure. Specified at parcel creation time. May not be subsequently modified. |
| TypeInfo1 | get, put | Type specific application level field. |
| TypeInfo2 | get, put | Type specific application level field. |
| TypeInfoText | get, put | Type specific application level field. Displayed to users on the Management Console UI. |
| CreationDate | get | Date parcel object is created. |
| TransferState | get | Specifies transfer state. |
| TransferStateDate | get | Timestamp of the last TransferState update. |
| TransferID | get | Internal transfer ID used to identify the original parcel transfer ID. |
| TransferAddress | get | Address (MSMQ queue name) where the parcel was originally sent. |
| ResponseAddress | get | Address (MSMQ queue name) where the first response to the parcel will be sent. |
| ContentsState | get, put | Application level contents state. This state is defined by applications that use this parcel type. |
| ContentsStateText | get, put | Text description of the contents state so that the state may be properly displayed to users via management console UI. |
| ContentsStateDate | get | Timestamp of the last ContentsState update. |
| ContextID | get | Specifies context identifier for this parcel (and subsequent bulletins and updates). |
| ContextType | get | Specifies the type of machine (gateway or BIS design) |
| NumComponents | get | Number of parcel components. |
| TotalLength | get | Size in bytes of the original parcel. |
| EnableImmediateSend | get, put | Specifies whether the Transfer Service should immediately begin sending messages or wait until the entire parcel has been queued. |
| CertifyState | get, put | Specifies whether the parcel is certified, meaning it can be resent in its entirety if the receiving machine loses its data for some reason. |
| CertifyDate | get | Timestamp of the last CertifyState update. |
| Errors | get | Returns an errors collection object. |

TABLE 3

Methods of Parcel Object 230

| Name | Description |
|---|---|
| UpdateInfo | Commits parcel property changes to the parcel database. |
| CreateParcelComponent | Creates a new parcel component to send data. |
| CommitSend | Finishes the send parcel sequence. |
| CancelSend | Cancels any send activities, including parcel components. The parcel will be removed from the parcel database. |
| CreateBulletin | Creates a new bulletin for the parcel. The bulletin type is an application-defined field. |
| Bulletins | Enumeration for all bulletins associated with the parcel. |
| BulletinsByState | Enumeration for all bulletins associated with the parcel based on bulletin information. |

TABLE 3-continued

Methods of Parcel Object 230

| Name | Description |
|---|---|
| BulletinsByDate | Enumerates all bulletins created within the date range. |
| FindBulletin | Returns a specific bulletin. Useful in response to a bulletin notification message. |
| ReceiveParcel | Begins the Receive Parcel operation, locking the parcel to prevent other applications from receiving the parcel contents. If the parcel has already been received (or is currently being received), this method will fail. |
| GetNextParcelComponent | Returns the next parcel component. If there are no more, it returns a NULL pointer. |
| CommitReceive | Finishes the receive sequence. Should only be executed when the receiver is completely done. |
| CancelReceive | Cancels the receive sequence. |
| LogEntries | Log Entry enumerator. |
| Delete | Deletes the parcel and all bulletins from the parcel database. |
| ResetReceive | Resets a parcel in the "receiving" state back to "ready to receive". Used by a cleanup application when a parcel receiving application is abnormally terminated. |
| Processed | Indicates whether the application successfully processed data subsequent to receiving it. |
| Refresh | Forces the parcel object to re-query the database for any updated values. |
| SendCertifiedReceipt | Specifies that the receiving application will never need the parcel data again (even in the event of a catastrophic failure), and the sending machine may clear its certified buffers. |
| Resend | Resends a certified parcel. |
| ClearErrors | Clears all errors from the errors collection. |

TABLE 4

Internal Methods of Parcel Object 230

| Name | Description |
|---|---|
| Init | Must be called immediately upon parcel creation. |
| NewParcel | Called by the parcel manager interface as a result of the CreateNewParcel method. The Notification object is the object to contact with updates to the parcel. |
| ArrivingParcelHeader | Called by the monitor object to initiate retrieval of a receive stream. |
| ArrivingParcelTrailer | Called by the monitor object to initiate retrieval of a trailer from a receive stream. |
| ExistingParcel | Called by the parcel manager interface to initialize a request for an existing parcel. Fails if the parcel is not found. |
| EnumeratedParcel | Called to populate an enumerated parcel. |

With continuing reference to FIG. 7, the parcel manager 134 has a parcel component object 232, which is used either to send or retrieve the actual data associated with a parcel. A parcel may have multiple parcel components, as defined at the application level. As one example, the biller can send over multiple tables of billing data to the service center for use in generating billing statements. The parcel manager 134 can create a parcel component object for each table and bundle the parcel component objects into one larger parcel object.

The parcel manager 134 has a bulletin object 234, which is the application-level object used to send update information about a parcel. If the update is small, such as a status update or a simple text message (e.g., "The data was successfully processed"), only the bulletin is sent. If more information is required, an extra detail component is created to support arbitrarily large size binary or text messages. The properties, methods, and internal methods of the bulletin object 234 are found in Tables 5, 6, and 7, respectively.

TABLE 5

Properties of Bulletin Object 234

| Name | put/get | Description |
|---|---|---|
| BulletinID | get | The unique ID of the bulletin |
| ParcelID | get | The parcel ID of the creating parcel. |
| BulletinCreationDate | get | Date bulletin is created. |
| BulletinType | get/put | Application level type. |
| DetailType | get | Type of detail: "none", "text" or "binary". |
| BulletinTransferState | get | Specifies transfer state. |
| BulletinTransferDate | get | Date bulletin is transferred. |
| BulletinTransferID | get | The internal transfer identifier. |
| ParcelContentsState | get, put | Specifies content state. |
| ParcelContentsStateText | get, put | Specifies state of text content. |
| ParcelContentsStateDate | get | Date of contents state. |
| Errors | get | Returns the errors colletion object. |

TABLE 6

Methods of Bulletin Object 234

| Name | Description |
|---|---|
| CreateDetail | Creates a optional bulletin detail message, specifying the type as either binary or text. |
| CommitSend | Commits the send operation. |
| CancelSend | Cancels the send operation. |
| GetDetail | Pointer to receive detail data. Bulletin data may be retrieved any number of times by different applications. |
| Receive | Marks the bulletin as received. No information is actually retrieved, since bulletin information (detail message) is permanently stored as part of the bulletin. |
| CommitReceive | Commits the receive operation. |
| CancelReceive | Cancels the receive operation. |
| UpdateInfo | Causes changes made to property fields to be written to the database. |
| Delete | Deletes the bulletin |
| Resend | Resends the bulletin. Used in certified parcel operations. |
| LogEntries | Returns a collection of bulletin log entries based on date range. |

TABLE 7

Internal Methods of Bulletin Object 234

| Name | Description |
|---|---|
| Init | Called immediately upon bulletin creation. |
| NewBulletin | Specifies that the bulletin is new. |
| ArrivingBulletin | Specifies that the bulletin should be creating from incoming data. |
| ExistingBulletin | Specifies that an existing bulletin should be used. |
| EnumeratedBulletin | Populates a bulletin. |

A log entry object 236 that is called to log the activity of the parcel manager 134. Each log entry contains an object ID (e.g., parcel, bulletin), a log sequence number, a date, a type of object, and a state of the object.

The parcel manager also has a notification object 238, which is created in response to an application's request. The notification object 238 supports event notifications. An application implements a notification interface and invokes the StartNotification method at the parcel manager interface 224 (see Table 1) to pass the interface to the notification object 238, along with a list of which events are to receive notifications. In this implementation, the notification object 238 does not actually seek out information, but instead waits until parcels call its ParcelUpdate method (Table 8 below) and in turn calls the appropriate interface methods of the applications that have asked for events.

The notification object 238 creates a monitor object 240 and calls its AddChannel method (Table 10 below) for each queue that an application has chosen to monitor. In this way, the notification object 238 will get informed of new parcel arrivals.

The methods and notification interface for the notification object 238 are found in Tables 8 and 9 below:

TABLE 8

Methods of Notification Object 238

| Name | Description |
|---|---|
| Init | Initializes the notification object. |
| ParcelUpdate | Sent by a parcel to inform the notification object that something has changed on the parcel. |
| NewParcel | Sent by a parcel when a new parcel is created. |
| NewArrival | Sent by a parcel when a new parcel is detected on a queue. |
| NewConfigContext | Sent by the parcel manager interface when a new configuration context entry is added to the parcel database table. |
| DeletedParcel | Sent by a parcel when a parcel is deleted. |
| AddNotification | Sent by the parcel manager interface to inform the notification object to add the specified event to its list of events. The method generates and returns a unique handle so that notification can be canceled. |
| StopNotification | Stops a previously started notification. |
| FlushChannel | Sent by the parcel manager to ensure that a specific channel is being monitored. If it is not, the notification server will explicitly check it before returning. |
| ClearErrors | Removes any errors stored in the errors collection object. |

TABLE 9

Notification Interface for Notification Object 238

| Name | Description |
|---|---|
| NewParcel | Called when a new parcel is created on the local system. |
| ParcelUpdate | Called when a change occurs to a monitored parcel. |
| NewArrival | Called when a parcel arrives on the queue. |
| DeletedParcel | Called when a parcel is deleted. |

The monitor object 240 checks the transfer services channels for new items in the channel. When the monitor object 240 is running (i.e., StartMonitor has been called) and finds a new parcel, it internally adds that parcel to a list of parcels to watch. When a trailer is found for that parcel, a parcel object is created for it, the trailer information is added to the parcel database, and the watch is terminated. Table 10 lists the methods supported by the monitor object 240.

TABLE 10

Methods for Monitor Object 240

| Name | Description |
|---|---|
| Init | Initializes the monitor object. |
| StartMonitor | Begins a separate thread to watch for incoming messages. |
| AddChannel | Tells the monitor object to add this channel (queue) to its list of queues to monitor. |

TABLE 10-continued

Methods for Monitor Object 240

| Name | Description |
|---|---|
| CancelMonitor | Terminates the monitor thread. |
| DeleteChannel | Instructs the monitor object to remove the channel (queue) from its list. |
| CycleMonitorThread | Forces the monitor thread to go through one loop, thus ensuring that all monitored channels have been checked. |

A configuration context object 242 is created by the parcel manager interface 224 to retrieve and manage configuration context records. These records store information about a specific channel (MSMQ queue or file system directory). The primary index is the context id, and each context id may be partitioned by parcel type, thus allowing separate channels (and potentially separate channel access and security) for different parcels.

Transfer Services

The transfer service 132 facilitates the physical movement of data. FIG. 7 shows the transfer services layer 132 in more detail. The transfer services layer 152 residing at the service center gateway 86 is essentially the same, and is not described in detail.

The transfer service 132 has three objects: a transfer services object 244, a send stream object 246, and a receive stream object 248. The transfer services object 244 is the wrapper around the transport mechanism (e.g., MSMQ or file system). Tables 11 and 12 define the properties and methods of the transfer services object 244.

TABLE 11

Properties for Transfer Services Object 244

| Name | put/get | Description |
|---|---|---|
| EnableImmediateSend | get, put | Specifies whether the actual transfer should begin immediately with the first message or wait until all messages have been written. |
| LineUp | get | For MSMQ, returns whether or not the transmission line for the queue is up. The file system implementation always returns true. |
| Errors | get | Returns the errors collection object. |

TABLE 12

Methods for Transfer Services Object 244

| Name | Description |
|---|---|
| Init | Initializes the transfer services method to a channel (MSMQ queue name or file system root directory). |
| StartSend | Starts a new series of messages by creating and returning a send stream object which can then be used to actually send/receive the messages. Internally creates an ID or "serial number" for the series. A send stream object is used to send a single parcel or bulletin. |
| GetNextHeader | Checks the queue (or file system) for new message series by checking for messages with the "header" designation. If found, the method returns a receive stream object so that the calling function can access the header and optionally data. The header message is removed from the queue. |

TABLE 12-continued

Methods for Transfer Services Object 244

| Name | Description |
| --- | --- |
| StartReceive | Based on a specific ID, the method returns a receive stream object so that the associated message series may be retrieved. |
| DeleteMessages | Deletes all messages with a given transfer ID within the channel. Used by the parcel manager to clean up deleted parcels that have not been fully sent or received. |
| CreateChannel | Creates a new channel and returns the created name (GUID for MSMQ). If the channel already exists, it simply returns the GUID. |
| DeleteChannel | Deletes the specified channel. |

The send stream object 246 is used to send a group of data messages, such as a group of parcel components. The data stream consists of a header message, one or more data messages, and a trailer message. The messages can be created in any order, but the receiver will not recognize the stream until the header message has been sent. The trailer message is preferably sent last. The properties and methods of the send stream object 246 are provided in Tables 13 and 14.

TABLE 13

Properties for Send Stream Object 246

| Name | put/get | Description |
| --- | --- | --- |
| ID | get | An internally generated, unique "serial number" associated with the message series. |
| Errors | get | Returns the errors collection object |

TABLE 14

Methods for Send Stream Object 246

| Name | Description |
| --- | --- |
| CreateSendStream | Creates a stream for a data message. |
| CreateHeaderStream | Creates a stream for a header message. The header message is preferably sent with high priority so that it appears at the beginning of the queue. |
| CreateSubHeaderStream | Creates a stream for a sub-header message. The sub-header message is used only by parcels to relay additional information needed to create the parcel entry in the receiving machine's parcel database. It is actually sent before the header to guarantee its presence when the header is read. |
| CreateTrailerStream | Creates a stream for a trailer message. The trailer message is generated after all other message streams have been closed and therefore queued for sending. |
| CommitSend | Commits the send operation |
| CancelSend | Aborts the entire stream of messages. |

The receive stream object 248 supports retrieving a series of messages from a queue. The object uses transactioning to protect retrieval. If retrieval fails, the entire retrieval is rolled back so that it may be attempted again. Tables 15 and 16 define the properties and methods of the receive stream object 248.

TABLE 15

Properties for Receive Stream Object 248

| Name | put/get | Description |
| --- | --- | --- |
| ID | get | The internally generated, unique "serial number" associated with the message series. Generated by the sender. |
| Errors | get | Returns the errors collection object. |

TABLE 16

Methods for Receive Stream Object 248

| Name | Description |
| --- | --- |
| GetNextReceiveStream | Creates a stream for the next message in the series of messages. When there are not more messages, the method returns false along with a NULL pointer to the stream. |
| GetHeaderStream | Creates a stream for the header message. |
| GetSubHeaderStream | Creates a stream for the sub-header message. |
| GetTrailerStream | Creates a stream for the trailer message. If the trailer message is not yet present, the method returns false along with a NULL pointer to the stream. |
| CancelReceive | Cancels the retrieval currently in progress. Messages retrieved using this object are put back into the queue. If the object is terminated improperly, then this method is automatically called to restore state. |
| CommitReceive | Commits the retrieval of messages associated with this object instance. |

Parcel Flow

In general, a parcel flows from a sending computer (e.g., the biller's BIS) to a receiving computer (e.g., service center). The sending computer creates a parcel of data (such as a template or a batch of payments) and sends it to the receiving computer. The receiving computer receives the parcel and processes it. Upon completion, the receiving application sends a bulletin back to the sender consisting of processing status.

Figure 8:
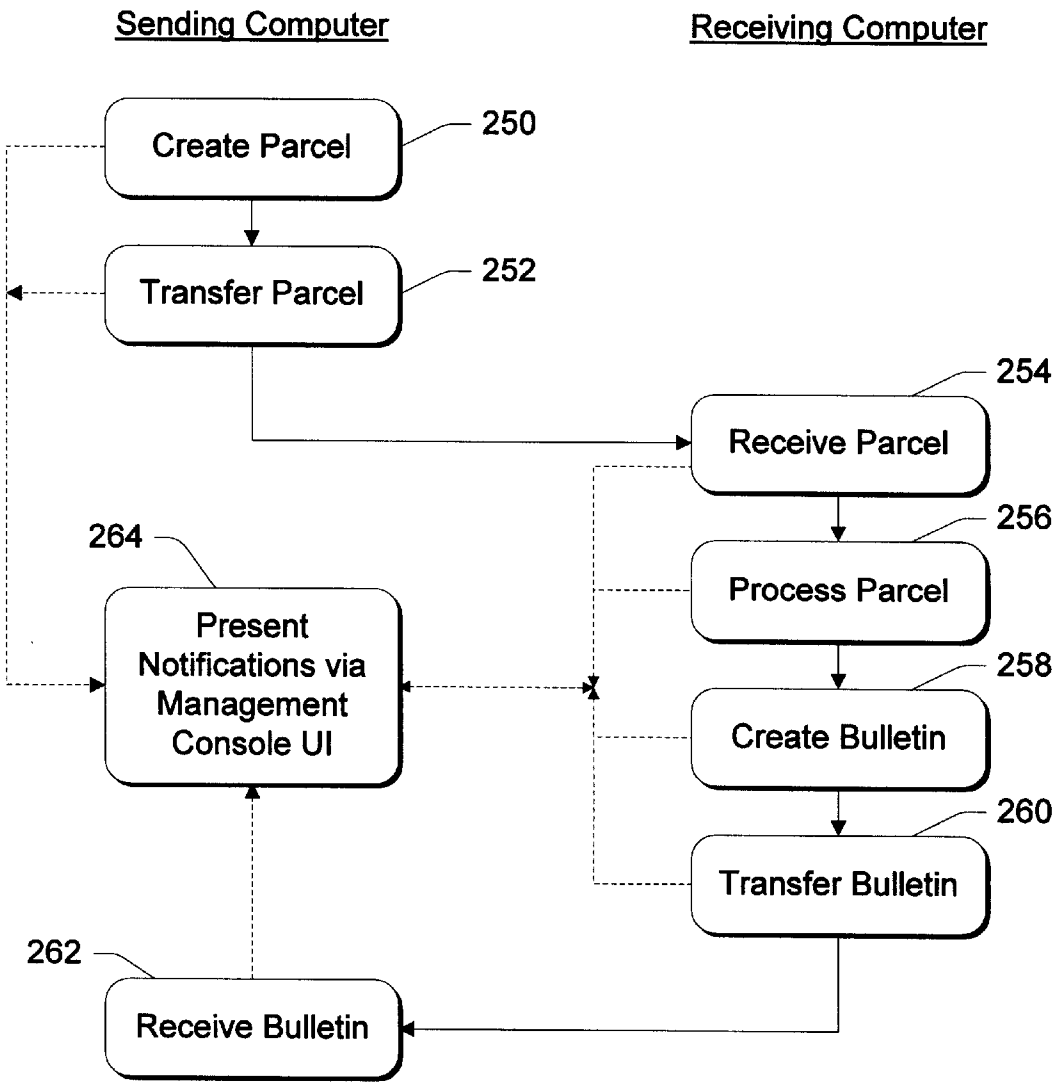
FIG. 8 is a flow diagram showing steps in a method for transferring a parcel between two computers in the billing system.

FIG. 8 shows the parcel flow process in more detail, with ongoing reference to FIG. 7. For convenience and illustration purposes, the objects shown in FIG. 7 are referenced for both the parcel manager resident at the sending computer and the parcel manager resident at the receiving computer.

At step 250, an application 220 running on the sending computer creates a parcel. The application instantiates a parcel manager object, and requests a new parcel object 230. For each piece to be transferred, the application asks the parcel object 230 to create a parcel component 232 and feeds the component the appropriate data. The contents and layout of the parcel are defined by the application. After all components have been created, the application 220 commits the parcel and terminates (or starts work on a new parcel).

At step 252, the parcel manager 134 begins the parcel transfer from the sending computer (e.g., BIS) to the receiving computer (e.g., service center). The parcel manager, with assistance from the transfer services 132, creates a "header" message that contains information to prepare the receiving computer (or instance of the parcel manager running thereon) to receive the parcel. The sending parcel manager converts the parcel components into a series of messages (e.g., MSMQ messages) and then creates a "trailer" message to inform the receiving computer that all of the parcel components have been sent. The parcel manager monitors the MSMQ activity and updates the internal database 228 to reflect that the parcel is being transferred to the receiving computer. The sending parcel manager may also return notifications to the application reflecting the current status.

At step 254, the parcel manager at the receiving computer begins receiving the parcel. The receiving parcel manager creates a new parcel entry in its internal database 228 from the information contained in the parcel "header" message. The receiving parcel manager propagates information about the existence of the parcel by adding a record to the parcel database. When the parcel has completely arrived, the parcel manager updates its database tables and generates a notification 238 to all applications that are monitoring the arrival of that particular parcel type.

At step 256, after the entire parcel is received and stored, a receiving application executing at the receiving site begins processing the parcel. The receiving application instantiates a parcel manager object and continuously or periodically checks for parcels of a certain type and of a certain state. When a parcel that meets the filter requirements is present, the application asks for the parcel and "locks" the parcel via the parcel status in the database so that no other application may retrieve the parcel contents. The application then queries the parcel object for components and retrieves each component. Upon successful retrieval of all components, the parcel manager deletes the series of messages from the transfer message queues. Upon completion, the receiving application asks the parcel manager for notifications whenever a new parcel of the specified type arrives on its queue.

At step 258, the parcel manager at the receiving computer creates one or more bulletins 234 to notify the sending computer that the parcel has been successfully transferred. More particularly, an application asks the parcel manager for the parcel object and creates a bulletin for the parcel. The application provides bulletin information such as a content state to the bulletin object 234. The application optionally generates either a text or binary data message. A textual message can be examined via the operations console. The application commits the bulletin.

At step 260, the parcel manager at the receiving computer (e.g., service center) transmits a bulletin back to the sending computer. The process is very similar to transferring a parcel. The parcel manager chooses a queue to send the bulletin. The parcel manager then generates a header message containing a "processing complete" transfer state. The parcel manager generates a data message containing the specifics of the bulletin, including any text or binary data. The parcel manager commits the data and updates the appropriate internal database tables to reflect that the bulletin has been sent to the sending computer. The parcel manager monitors MSMQ activity about the series of messages through callback functions, updating its internal database and sending out notifications to requesting applications.

At step 262, the sending computer (e.g., BIS) receives the incoming bulletin and routes it to the proper instance of the parcel manager. A parcel table stored in the parcel database 228 at the sending computer track parcels that have originated from that computer. If the parcel does not exist at the system, there is a likelihood that the system has experienced some kind of failure and hence the computer uses the header information to recreate the appropriate parcel table entry. Once selected, the parcel manager updates its internal database tables and loads the data into the details table in the parcel database 228. The parcel manager deletes the queued message and sends out notifications 238 to anyone monitoring bulletins on that particular parcel.

At step 264, the management console presents the bulletin contents through the UI (FIG. 4). The management console instantiate the parcel manager and requests the status of all parcels for a given time period. The management console asks for notification when any event occurs. These notifications are generated throughout the parcel transfer and bulletin feedback process, as represented diagrammatically by the dashed paths from steps 250–262 to step 264.

When a notification arrives, the management console asks for a parcel object for the changed parcel and updates the UI screen based on the state of the parcel and its contents. More particularly, the management console module adds a new entry to the list (such as entries 104–112 in FIG. 4) reflecting the location and status of a particular parcel and its contents. FIG. 4 illustrates three entries 106, 108, and 110 for the same parcel #6407, which reflects different locations and statuses of the parcel. The first two entries 106 and 108 result from the steps in the parcel transfer process. Entry 106, which indicates that the biller is sending the parcel containing the Dec. 1, 1997 batch to the service center, is generated as a result of step 252. Entry 108, which reflects that the parcel has been processed and loaded in the service center database, might be the result of a notification sent out during step 256.

Operation of BIS and Service Center Gateways

During a normal billing cycle, the biller sends a batch of billing data to the service center. The biller may also submit a template, rules, and resources if the service center does not already have them on file. The service center creates billing statements from the billing data and templates, and distributes them to consumers. When a consumer authorizes payment, the service center facilitates collection of the funds. The service center then disburses the collected payments to the biller. To illustrate how the gateways operate to transfer billing-related data, two exemplary tasks are described below.

Figure 9:
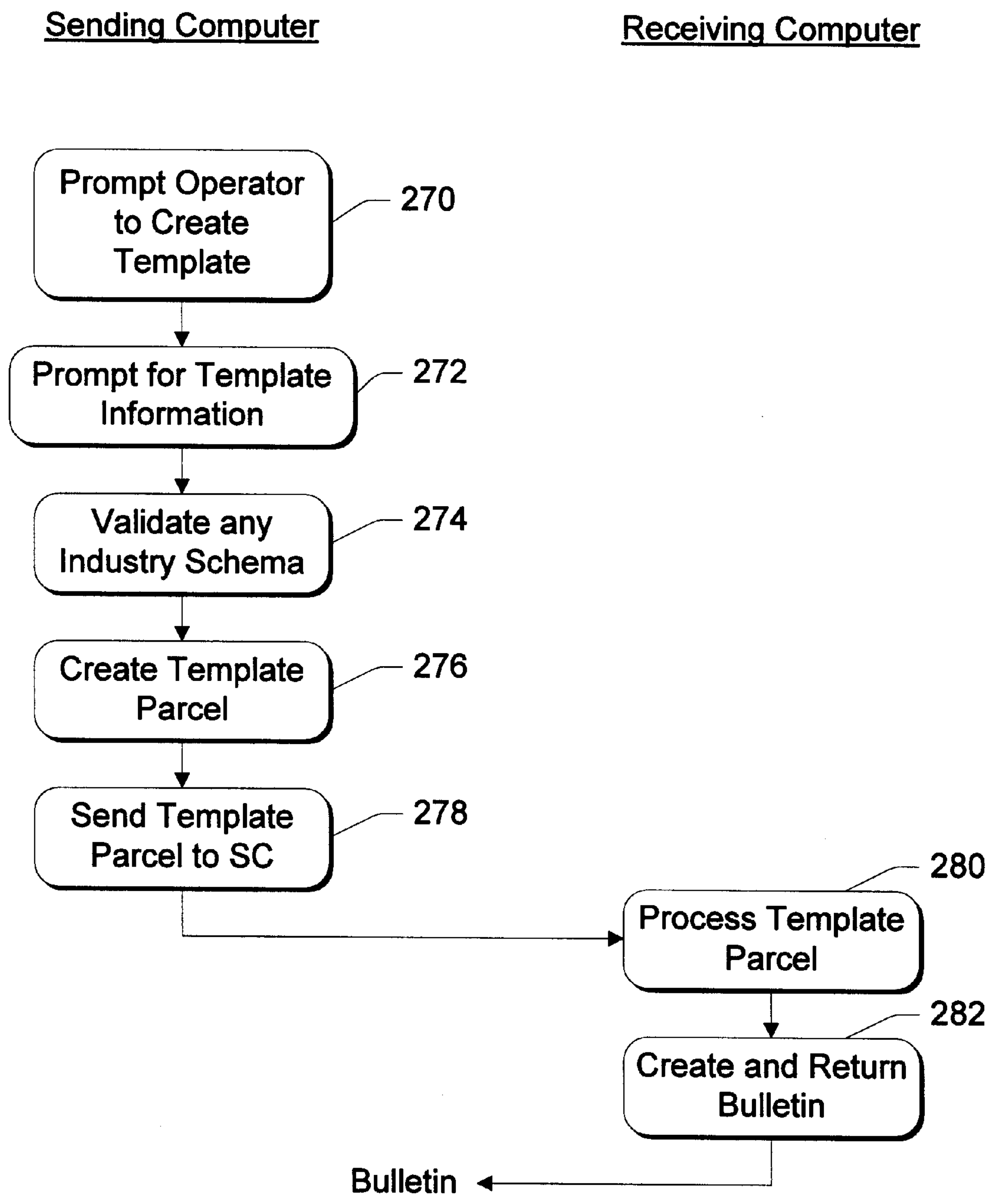
FIG. 9 is a flow diagram showing steps in a method for handling a billing template through the gateways as it moves from the biller to the service center.

Exemplary Task 1: FIG. 9 shows a method for handling templates. At step 270, the biller operator invokes the management console and chooses a "Create Template" option. At step 272, the management console UI presents a dialog box requesting three pieces of information: the name of a template file, the biller ID, and a new template name. The template file name and biller ID are used at the service center to uniquely identify a particular template. The template name is any unique name that is convenient to remember for the biller.

If the template contains industry schema, the BIS gateway validates this schema (step 274). The BIS gateway assigns a template ID to the newly created template (step 276). The template ID is recorded in the BIS database144.

The statement designer application 62 calls via the template handler 142 into the parcel manager interface 224 to create a template parcel (step 276). The template parcel 230 contains the following information: biller ID, template ID, industry schema ID, and template name. The parcel is sent to the service center during the next connection with the service center (step 278). The service center processes the template parcel and adds a record to the template table (step 280). The service center's parcel manager generates and returns a bulletin indicating that the template has been received and installed at the service center (step 282).

Figure 10:
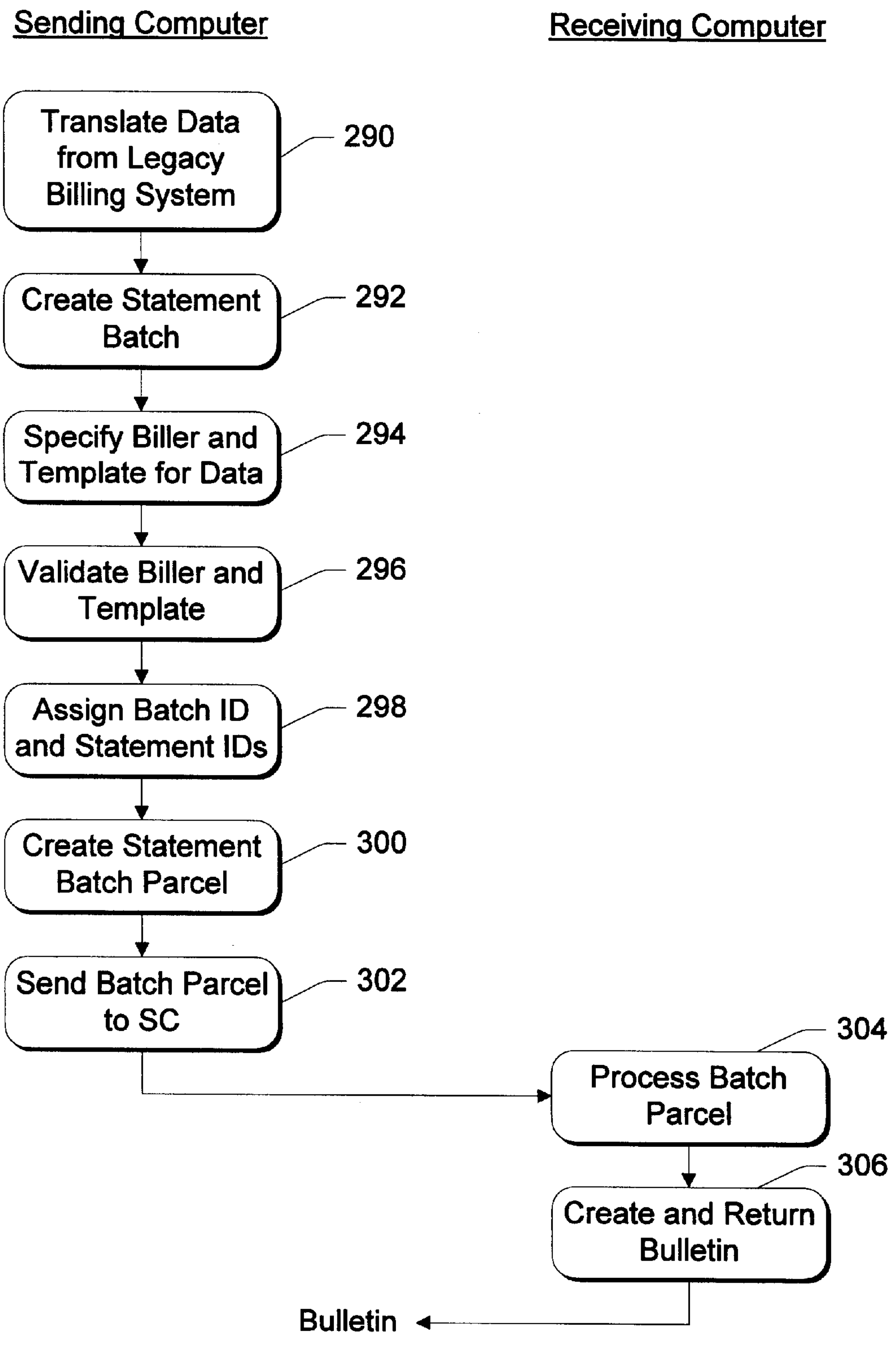
FIG. 10 is a flow diagram showing steps in a method for handling a batch of billing data through the gateways as it moves from the biller to the service center.

Exemplary Task 2: FIG. 10 shows a method for handling a batch of billing data for an installed template. The biller creates billing data using its legacy billing system. The billing data is passed through the statement data translator 28 (step 290). The translator instantiates a statement batch object to hold the data (step 292). The translator 28 specifies the biller and the template to be associated with the billing data (step 294) and validates the specified biller and template against records of authorized billers and installed templates received from the service center (step 296). This validation process ensures that the billing data is for an approved biller recognized by the service center and is for an template that is installed at the service center. The statement translator 28 then loads data into the statement batch object. The statement batch object accepts data that complies with the available fields in the industry schema tables.

The BIS gateway assigns a batch ID to the statement batch and a statement ID to each statement in the batch (step 298). The statement data translator 28 calls via the batch handler 140 into the parcel manager interface 224 to create a statement batch parcel (step 300). The batch parcel contains the following information: biller ID, batch ID, template ID, template rule ID, resource table records, statement table records, and industry table records. The batch parcel is sent to the service center during the next connection with the service center (step 302). The service center processes the batch parcel and loads the data into the service center database (step 304). The service center's parcel manager generates and returns a bulletin indicating that the batch has been received and loaded at the service center (step 306).

Other tasks in addition to handling the template and billing data include processing the payment receipt and exchanging consumer information (e.g., new registration, change of address, etc.). These tasks function similarly in that the BIS or service center create parcel objects and use the parcel manager to exchange the information. For each separate task, however, the BIS calls into the parcel manager using a handler for that task, such as the consumer information handler 136 and the payment handler 138.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A system for creating an electronic billing statement comprising:

biller integration systems resident at multiple billers, each biller integration system enabling an associated biller to create a statement template for an electronically-renderable customized billing statement that visually presents billing data in a customized arrangement determined by the associated biller;

a service center system to prepare and electronically distribute the electronic billing statements on behalf of the billers, the service center system preparing the customized billing statements from the statement template and the billing data received from the biller integration systems; and a gateway system interfacing the biller integration systems and the service center system to facilitate transfer of the statement templates and the billing data from the biller integration systems to the service center and to monitor various transfer states of the statement templates and the billing data as they are transferred, wherein the gateway system includes:

an interface handler to handle a request to create a parcel that is particularized to contain and carry a particular type of data that was requested, the particular type of data being selected from the group consisting of consumer information data, payment data, batch statement data, and statement template data; and a parcel manager to create the parcel that is requested via the interface handler.

2. A system as recited in claim 1, wherein said each biller integration system comprises a statement designer which enables the associated biller to embed and organize data fields within the statement template and to associate billing data with the data fields.

3. A system as recited in claim 1, wherein said each biller integration system has one or more industry schema tables that contains predefined industry-specific billing categories from which the associated biller can select during creation of a statement template.

4. A system as recited in claim 1, wherein said each biller integration system comprises a translator to convert the billing data from the associated biller's existing billing system to a format accepted by the biller integration system.

5. A system as recited in claim 1, wherein the gateway system comprises a gateway resident at said each biller integration system and a gateway at the service center.

6. A system as recited in claim 1, wherein said each biller integration system has a management console that supports a user interface (UI), the management console interfacing with the gateway system to manage transfer of the statement templates and the billing data to the service center.

7. A system as recited in claim 1, wherein said each biller integration system has a management console that supports a user interface (UI), the management console interfacing with the gateway system to present the transfer states of the statement templates and the billing data on the UI so that the associated biller can track the statement templates and the billing data as they are transferred to the service center.

8. A system as recited in claim 1, wherein the request to create the parcel originates at one of the biller integration systems for transmittal to the service center system.

9. A system as recited in claim 1, wherein the interface handler is an object that is called via an API.

10. A system as recited in claim 9, wherein the object is a component object model implementation.

11. A system as recited in claim 1, wherein the particular type of data is batch statement data.

12. A system as recited in claim 1, wherein the request to create the parcel originates at the service center system for transmittal to one of the biller integration systems.

13. A system as recited in claim 1, wherein the gateway system further comprises:

a biller gateway system resident at each said biller integration system and including:

an biller interface handler to handle a request to create a parcel that is particularized to contain and carry to the service center system said particular type of data that was requested; and a biller parcel manager to create the parcel that is requested via the biller interface handler; and a service center gateway system resident at the service center system and including:

a service center interface handler to handle a request to create a parcel that is particularized to contain and carry to one of the biller integration systems said particular type of data that was requested; and a service center parcel manager to create the parcel that is requested via the service center interface handler.

14. A biller integration system, which interfaces with an existing billing system of a biller, comprising:

a translator to convert billing data from the biller's existing billing system to a particular format;

a statement designer to create a statement template for visually presenting the billing information in a customized arrangement that is determined by a biller; and a gateway to facilitate transfer of the statement template and the billing data to a billing service center and to monitor status of the statement templates and the billing data as they are transferred, the gateway comprising:

a set of one or more interface handlers to handle requests for creating parcels, each said parcel being particularized to contain and carry to the service center system a particular type of data that was requested, the particular type of data being selected from the group consisting of consumer information data, payment data, batch statement data, and said statement template data;

a parcel manager to create the parcels requested via the set of interface handlers; and a transfer service layer to interface the parcel manager with an underlying transport mechanism to physically transport the parcels to the billing service center.

15. A biller integration system as recited in claim 14, further comprising a management console that supports a user interface (UI), the management console interfacing with the gateway to manage transfer of the statement templates and the billing data to the service center.

16. A biller integration system as recited in claim 14, further comprising a management console that supports a user interface (UI), the management console interfacing with the gateway to present the status of the statement templates and the billing data on the UI as they are transferred.

17. A biller integration system as recited in claim 14, wherein the statement designer offers one or more industry schema tables that contain predefined industry-specific billing categories for use in designing the statement template.

18. A biller integration system as recited in claim 14, further comprising a database having one or more industry schema tables stored thereon, each industry table containing predefined industry-specific billing categories for storing the billing data converted by the translator.

19. A biller integration system as recited in claim 14, wherein the translator, the statement designer, and the gateway are embodied as software modules stored on a computer-readable medium.

20. A biller integration system as recited in claim 14, wherein each said request to create each said parcel originates at one of the biller integration systems for transmittal to the service center system.

21. A biller integration system as recited in claim 14, wherein each said interface handler is an object that is called via an API.

22. A biller integration system as recited in claim 21, wherein the object is a component object model (COM) implementation.

23. A biller integration system as recited in claim 14, wherein the particular type of data is batch statement data.

24. In an electronic billing system, a gateway system to support billing applications requiring transmission of data, comprising:

a set of one or more interface handlers to interface with the billing applications and to handle a request by one of the billing applications for creating a parcel to carry the data in a transmission over an underlying transport mechanism, wherein:

the request is for the parcel to be particularized to contain and carry a particular type of data; and the particular type of data is selected from the group consisting of consumer information data, payment data, batch statement data, and statement template data;

a parcel manager, accessible by the interface handlers, to create the particularized type of parcel that is requested by one of the billing applications; and a transfer service layer to provide an interface between the parcel manager and the underlying transport mechanism that physically transmits the particularized type of parcel that is requested by one of the billing applications.

25. In an electronic billing system in which a biller submits billing data to a service center and the service center generates billing statements from the billing data and electronically distributes the billing statements to consumers on behalf of the biller, a method comprising the following steps:

defining a statement template for visually presenting the billing data;

transmitting, from the service center to a batch statement interface handler at the biller, a request to create a billing data parcel that is particularized to contain and carry the billing data;

transmitting, from the service center to a statement template interface handler at the biller, a request to create a statement template parcel that is particularized to contain and carry statement template data;

creating, at the biller, the billings data parcel;

creating, at the biller, the statement template parcel;

transferring, by separate transmissions from the biller, the billing data parcel and the statement template parcel to the service center;

monitoring a status of each of the billing data parcel and the statement template parcel as they are transferred to the service center;

generating multiple bulletins, at the service center, regarding the status of each of the billing data parcel and the statement template parcel as the status changes; and sending the bulletins occasionally from the service center to the biller to update the biller as to a current status of the each of the billing data parcel and the statement template parcel.

26. A method as recited in claim 25, further comprising the step of displaying the status in a user interface.

27. A computer program embodied on a computer-readable medium to perform the steps in the method as recited in claim 25.

* * * * *